(12) United States Patent
Cheng et al.

(10) Patent No.: US 11,864,142 B2
(45) Date of Patent: Jan. 2, 2024

(54) USER EQUIPMENT AND METHOD FOR TIMING ALIGNMENT

(71) Applicant: FG Innovation Company Limited, Tuen Mun (HK)

(72) Inventors: Chien-Chun Cheng, Taipei (TW); Hsin-Hsi Tsai, Taipei (TW); Wan-Chen Lin, Taipei (TW); Hai-Han Wang, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 8 days.

(21) Appl. No.: 17/709,888

(22) Filed: Mar. 31, 2022

(65) Prior Publication Data

US 2022/0330187 A1  Oct. 13, 2022

Related U.S. Application Data

(60) Provisional application No. 63/169,140, filed on Mar. 31, 2021.

(51) Int. Cl.
*H04W 56/00* (2009.01)
*G01S 19/25* (2010.01)
*H04L 1/18* (2023.01)
*H04L 1/1812* (2023.01)
*H04W 84/06* (2009.01)

(52) U.S. Cl.
CPC ......... *H04W 56/004* (2013.01); *G01S 19/256* (2013.01); *G01S 19/258* (2013.01); *H04L 1/1812* (2013.01); *H04W 84/06* (2013.01)

(58) Field of Classification Search
CPC ... H04W 56/004; H04W 84/06; G01S 19/256; G01S 19/258; H04L 1/1812
See application file for complete search history.

(56) References Cited

U.S. PATENT DOCUMENTS

| | | | |
|---|---|---|---|
| 10,554,293 B1* | 2/2020 | Chin | H04W 74/006 |
| 2014/0098798 A1* | 4/2014 | Khandekar | H04W 56/0055 370/336 |
| 2021/0068065 A1* | 3/2021 | Wigard | H04W 74/0833 |
| 2021/0153193 A1* | 5/2021 | Lin | H04W 56/0065 |

(Continued)

OTHER PUBLICATIONS

Moderator (MediaTek), "Summary #4 of AI 8.15.2 Enhancements to time and frequency synchronization", 3GPP TSG RAN WG1 Meeting #104e Jan. 25-Feb. 5, 2021, R1-2102103.

(Continued)

*Primary Examiner* — Bailor C Hsu
(74) *Attorney, Agent, or Firm* — ScienBiziP, P.C.

(57) ABSTRACT

A method and a user equipment (UE) for timing alignment is provided. The method comprises receiving, from a Base Station (BS), a first configuration indicating at least one of a scheduling offset, a common Timing Advance (TA), and satellite ephemeris information; receiving, from the BS, a second configuration indicating a TA offset for a TA variable; determining a UE-specific TA based on the satellite ephemeris information; determining a total TA based on at least one of the TA variable, the TA offset for the TA variable, the common TA, and the UE-specific TA; and starting, from a transmission by the UE, a time window after an additional time based on the total TA and the scheduling offset.

18 Claims, 10 Drawing Sheets

(56) References Cited

U.S. PATENT DOCUMENTS

| | | | |
|---|---|---|---|
| 2021/0227602 A1* | 7/2021 | Li | H04W 76/14 |
| 2021/0337598 A1* | 10/2021 | Ma | H04W 72/0446 |
| 2022/0046566 A1* | 2/2022 | Leng | H04W 56/0045 |
| 2022/0124735 A1* | 4/2022 | Rasool | H04W 60/00 |
| 2022/0124795 A1* | 4/2022 | Wu | H04B 7/185 |
| 2022/0124834 A1* | 4/2022 | Jeong | H04W 74/0866 |
| 2022/0131599 A1* | 4/2022 | Kim | H04B 7/18513 |
| 2022/0167297 A1* | 5/2022 | Wang | H04B 7/18513 |
| 2022/0232503 A1* | 7/2022 | Cheng | H04W 56/0045 |
| 2022/0255619 A1* | 8/2022 | Yu | H04B 7/1853 |
| 2022/0330191 A1* | 10/2022 | Shin | G01S 19/258 |
| 2022/0353837 A1* | 11/2022 | Hosseinian | H04W 56/0015 |
| 2023/0105278 A1* | 4/2023 | Kim | H04B 7/18563 370/503 |

OTHER PUBLICATIONS

InterDigital, "Stage-3 running CR for TS 38.321 for Rel-17 NTN", 3GPP RAN WG2 Meeting #113bis-e eMeeting Apr. 12-Apr. 23, 2021, R2-2102052.

MediaTek, Eutelsat, "UE Time and frequency Synchronisation for NR-NTN", 3GPP TSG RAN WG1 Meeting #104e Jan. 25-Feb. 5, 2021, R1-2100595.

Moderator (Thales), "FL Summary on enhancements on UL time and frequency synchronization for NR", P3GPP TSG-RAN WG1 Meeting #104-e e-Meeting, Jan. 25-Feb. 5, 2021, R1-2102215.

3GPP TS 38.213, "3rd Generation Partnership Project; Technical Specification Group Radio Access Network; NR; Physical layer procedures for control (Release 16)", V16.4.0 (Dec. 2020).

3GPP TS 38.214, "3rd Generation Partnership Project; Technical Specification Group Radio Access Network; NR; Physical layer procedures for data (Release 16)", V16.4.0 (Dec. 2020).

3GPP TS 38.321, "3rd Generation Partnership Project; Technical Specification Group Radio Access Network; NR; Medium Access Control (MAC) protocol specification (Release 16)", V16.4.0 (Mar. 2021).

3GPP TR 38.821, "3rd Generation Partnership Project; Technical Specification Group Radio Access Network; Solutions for NR to support non-terrestrial networks (NTN) (Release 16)", V16.0.0 (Dec. 2019).

3GPP TR 38.811, "3rd Generation Partnership Project; Technical Specification Group Radio Access Network; Study on New Radio (NR) to support non-terrestrial networks (Release 15)", V15.4.0 (Sep. 2020).

Moderator (Ericsson), "Feature lead summary#4 on timing relationship enhancements", 3GPP TSG-RAN WG1 Meeting #104-e e-Meeting, Jan. 25-Feb. 5, 2021, R1-2102078.

Moderator (MediaTek), "Summary #1 of AI 8.15.2 Enhancements to time and frequency synchronization", 3GPP TSG RAN WG1 Meeting #104e Jan. 25-Feb. 5, 2021, R1-2101803.

* cited by examiner

USER EQUIPMENT AND METHOD FOR TIMING ALIGNMENT

CROSS-REFERENCE TO RELATED APPLICATION(S)

The present disclosure claims the benefit of and priority to U.S. Provisional Patent Application Ser. No. 63/169,140, filed on Mar. 31, 2021, entitled "ENHANCEMENT ON UL TIMING IN NTN," the content of which is hereby incorporated fully by reference herein into the present disclosure for all purposes.

FIELD

The present disclosure is related to wireless communication, and more specifically, to timing alignment in a wireless communication system.

BACKGROUND

Various efforts have been made to improve different aspects of wireless communication for cellular wireless communication systems, such as fifth generation (5G) new radio (NR), by improving data rate, latency, reliability, and mobility in these systems. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art, such as improvements in timing alignment for Non-Terrestrial Network (NTN) wireless communication.

SUMMARY

The present disclosure is related to timing alignment in a wireless communication system.

In a first aspect of the present disclosure, a method performed by a User Equipment (UE) for timing alignment is provided. The method comprises receiving, from a Base Station (BS), a first configuration indicating at least one of a scheduling offset, a common Timing Advance (TA), and satellite ephemeris information; receiving, from the BS, a second configuration indicating a TA offset for a TA variable; determining a UE-specific TA based on the satellite ephemeris information; determining a total TA based on at least one of the TA variable, the TA offset for the TA variable, the common TA, and the UE-specific TA; and starting, from a transmission by the UE, a time window after an additional time based on the total TA and the scheduling offset.

In an implementation of the first aspect, the time window is a Random Access (RA) response window or a Message B (MsgB) response window.

In another implementation of the first aspect, the transmission by the UE occurs on a Physical Random Access Channel (PRACH).

In an implementation of the first aspect, the TA variable is a TA between a Downlink (DL) transmission of the UE and an Uplink (UL) transmission of the UE.

In an implementation of the first aspect, the first configuration is a Non-Terrestrial Network (NTN) configuration.

In an implementation of the first aspect, the first configuration is received via System Information (SI).

In an implementation of the first aspect, a unit of the scheduling offset comprises a number of slots.

In an implementation of the first aspect, the method further comprises determining the scheduling offset to be zero if the scheduling offset is not provided by the BS.

In another implementation of the first aspect, the method further comprises setting a length of a timer by increasing a value based on the UE-specific TA and the scheduling offset.

In an implementation of the first aspect, the timer is a Discontinuous Reception (DRX) Hybrid Automatic Repeat Request (HARQ) Round Trip Time (RTT) timer.

In a second aspect of the present disclosure, a UE in a wireless communication system for timing alignment is provided. The UE comprises at least one processor; and at least one memory coupled to the at least one processor, the at least one memory storing computer-executable instructions that, when executed by the at least one processor, cause the UE to receive, from a Base Station (BS), a first configuration indicating at least one of a scheduling offset, a common Timing Advance (TA), and satellite ephemeris information; receive, from the BS, a second configuration indicating a TA offset for a TA variable; determine a UE-specific TA based on the satellite ephemeris information; determine a total TA based on at least one of the TA variable, the TA offset for the TA variable, the common TA, and the UE-specific TA; and start, from a transmission by the UE, a time window after an additional time based on the total TA and the scheduling offset.

BRIEF DESCRIPTION OF THE DRAWINGS

Aspects of the present disclosure are best understood from the following detailed disclosure when read with the accompanying drawings. Various features are not drawn to scale.ABimensions of various features may be arbitrarily increased or reduced for clarity of discussion.

DESCRIPTION

Figure 1:
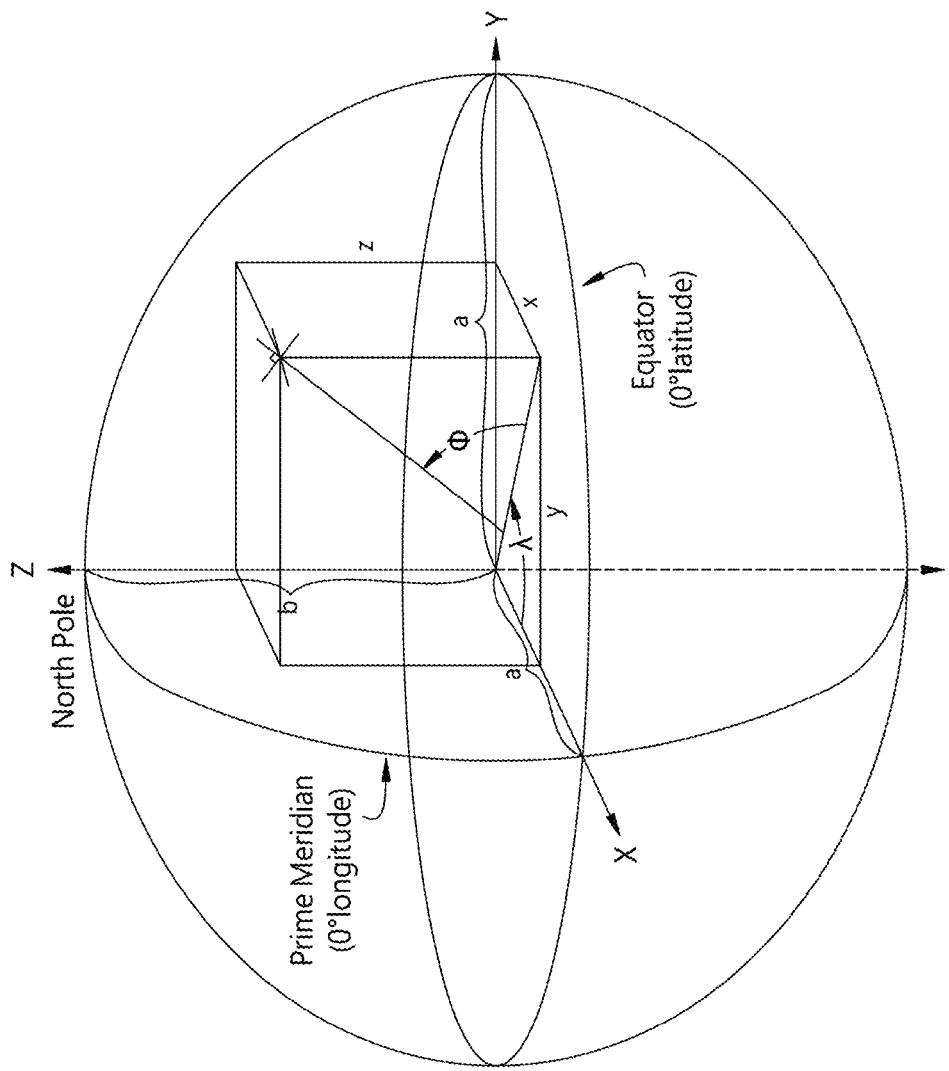
FIG. 1 illustrates a schematic diagram of Earth-Centered, Earth-Fixed (ECEF) coordinates in relation to latitude and longitude, according to an example implementation of the present disclosure.

Abbreviations used in this disclosure include:

| Abbreviation | Full name |
| --- | --- |
| 3GPP | 3rd Generation Partnership Project |
| ACK | Positive Acknowledgement |
| BS | Base Station |
| BWP | Bandwidth Part |
| CC | Component Carrier |
| CG | Configured Grant |
| CN | Core Network |
| CRC | Cyclic Redundancy Check |
| C-RNTI | Cell-Radio Network Temporary Identifier |
| CS-RNTI | Configured Scheduling-Radio Network Temporary Identifier |
| CSI | Channel State Information |
| CP | Cyclic Prefix |
| DCI | Downlink Control Information |
| DL | Downlink |
| DMRS | DeModulation Reference Signal |
| DRX | Discontinuous Reception |
| eNB | Evolved Node B |
| FDD | Frequency Division Duplexing |
| FFS | For Further Study |
| FFT | Fast Fourier Transform |
| FOV | Field of View |
| GEO | Geostationary Orbiting |
| gNB | Next Generation Node B |
| GW | Gateway |
| HARQ | Hybrid Automatic Repeat Request |
| ID | Identifier/Identity |
| IE | Information Element |
| LEO | Low Earth Orbiting |
| MAC | Medium Access Control |
| MCS-C-RNTI | Modulation Coding Scheme-Cell-Radio Network Temporary Identifier |
| MCG | Master Cell Group |
| MN | Master Node |
| Msg | Message |
| NAS | Non-Access Stratum |
| NR | New Radio |
| NR-U | New Radio-Unlicensed |
| NPUSCH | Narrowband Physical Uplink Shared Channel |
| NPUCCH | Narrowband Physical Control Channel |
| NPRACH | Narrowband Physical Random Access Channel |
| NTN | Non-Terrestrial Network |
| NW | Network |
| OFDM | Orthogonal Frequency Division Multiplexing |
| PCell | Primary Cell |
| PDCCH | Physical Downlink Control Channel |
| PDSCH | Physical Downlink Shared Channel |
| PHY | Physical Layer |
| PLMN | Public Land Mobile Network |
| PRACH | Physical Random Access Channel |
| PSCell | Primary Secondary Cell |
| PUCCH | Physical Uplink Control Channel |
| PUSCH | Physical Uplink Shared Channel |
| RA | Random Access |
| RA-RNTI | Random Access-Radio Network Temporary Identifier |
| RACH | Random Access Channel |
| RAR | Random Access Response |
| RAN | Radio Access Network |
| Rel | Release |
| RF | Radio Frequency |
| RNTI | Radio Network Temporary Identifier |
| RO | RACH Occasion |
| RRC | Radio Resource Control |
| RS | Reference Signal |
| RTT | Round Trip Time |
| RX | Reception |
| SCell | Secondary Cell |
| SCG | Secondary Cell Group |
| SCH | Shared Channel |
| SCS | Sub Carrier Spacing |
| SFN | System Frame Number |
| SI | System Information |
| SIB | System Information Block |
| SL | Sidelink |
| SN | Secondary Node |
| SPS | Semi-Persistent Scheduling |
| SR | Scheduling Request |
| SpCell | Special Cell |
| SS | Synchronization Signal |
| SSB | Synchronization Signal Block |
| SSS | Secondary Synchronization Signal |
| TA | Timing Advance |
| TAC | Timing Advance Command |
| TAG | Timing Advance Group |
| TB | Transport Block |
| TD | Timing Delay |
| TDD | Time Division Duplexing |
| TS | Technical Specification |
| Tx | Transmission |
| UCI | Uplink Control Information |
| UE | User Equipment |
| UL | Uplink |
| URLLC | Ultra-Reliable and Low Latency Communication |
| VAST | Viewer Access Satellite Television |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

Additionally, for the purpose of non-limiting explanation, specific details, such as functional entities, techniques, protocols, standards, and the like, are set forth for providing an understanding of the disclosed technology. In other examples, a detailed disclosure of well-known methods, technologies, systems, architectures, and the like are omitted in order not to obscure the present disclosure with unnecessary details.

Persons skilled in the art will immediately recognize that any NW function(s) or algorithm(s) in the present disclosure may be implemented by hardware, software, or a combination of software and hardware. Disclosed functions may correspond to modules that may be software, hardware, firmware, or any combination thereof. The software implementation may comprise computer-executable instructions stored on computer-readable media such as memory or other types of storage devices.

For example, one or more microprocessors or general-purpose computers with communication processing capability may be programmed with corresponding executable instructions and carry out the disclosed NW function(s) or algorithm(s). The microprocessors or general-purpose computers may be formed of Application-Specific Integrated Circuits (ASICs), programmable logic arrays, and/or using one or more Digital Signal Processor (DSPs). Although some of the example implementations in the present disclosure are directed to software installed and executing on computer hardware, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., an LTE system, an LTE-Advanced (LTE-A) system, or an LTE-Advanced Pro system) typically includes at least one BS, at least one UE, and one or more optional NW elements that provide connection towards an NW. The UE communicates with the NW (e.g., a CN, an Evolved Packet Core (EPC) NW, an Evolved Universal Terrestrial Radio Access NW (E-UTRAN), a Next-Generation Core (NGC), a 5G Core (5GC) Network or an Internet), through a RAN established by the BS/Cell.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a RAN.

A BS may include, but not limited to, a Node B (NB) as in the Universal Mobile Telecommunication System (UMTS), an eNB as in the LTE-A, a Radio NW Controller (RNC) as in the UMTS, a Base Station Controller (BSC) as in the Global System for Mobile communications (GSM)/GSM EDGE (Enhanced Data rates for GSM Evolution) Radio Access NW (GERAN), a Next Generation eNB (ng-eNB) as in an E-UTRA BS in connection with the 5GC, a gNB as in the 5G Access NW (5G-AN), and any other apparatus capable of controlling radio communication and managing radio resources within a cell. The BS may connect to serve the one or more UEs through a radio interface to the NW.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), LTE-A Pro, and a next generation RAT. However, the scope of the present disclosure should not be limited to the protocols previously disclosed.

The BS may be operable to provide radio coverage to a specific geographical area using a plurality of cells included in the RAN. The BS may support the operations of the cells. Each cell is operable to provide services to at least one UE within its radio coverage. More specifically, each cell (often referred to as a serving cell) may provide services to serve one or more UEs within its radio coverage (e.g., each cell schedules the DL and optionally UL resources to at least one UE within its radio coverage for DL and optionally UL packet transmissions). The BS may communicate with one or more UEs in the radio communication system through the plurality of cells. A cell may allocate sidelink (SL) resources for supporting proximity service (ProSe). Each cell may have overlapped coverage areas with other cells.

In Multi-RAT Dual Connectivity (MR-DC) cases, the primary cell of an MCG or a SCG may be called as a SpCell. A PCell may refer to the SpCell of an MCG. A PSCell may refer to the SpCell of an SCG. MCG refers to a group of serving cells associated with a MN, comprising the SpCell and optionally one or more SCells. SCG refers to a group of serving cells associated with a Secondary Node (SN), comprising the SpCell and optionally one or more SCells.

In some implementations, the UE may not have (LTE/NR) RRC connections with the concerned serving cells of the associated services. In other words, the UE may not have UE-specific RRC signal exchange with the serving cell. Instead, the UE may only monitor the DL synchronization signals (e.g., DL synchronization burst sets) and/or broadcast SI related to the concerned services from such serving cells. In addition, the UE may have at least one serving cell on one or more target SL frequency carriers for the associated services. In some other implementations, the UE may consider the RAN which configures one or more of the serving cells as a serving RAN.

As previously disclosed, the frame structure for NR supports flexible configurations for accommodating various next generation (e.g., 5G) communication requirements, such as eMBB, mMTC, and URLLC, while fulfilling high reliability, high data rate, and low latency requirements. The OFDM technology, as disclosed in 3GPP, may serve as a baseline for an NR waveform. The scalable OFDM numerology, such as the adaptive sub-carrier spacing, the channel bandwidth, and the CP, may also be used. Additionally, two coding schemes are considered for NR: (1) low-density parity-check (LDPC) code and (2) polar code. The coding scheme adaption may be configured based on the channel conditions and/or service applications.

It is also considered that in a transmission time interval of a single NR frame, at least DL transmission data, a guard period, and UL transmission data should be included. The respective portions of the DL transmission data, the guard period, the UL transmission data should also be configurable, for example, based on the NW dynamics of NR. In addition, SL resources may also be provided in an NR frame to support ProSe services.

Any two or more than two of the following sentences, paragraphs, (sub)-bullets, points, actions, behaviors, terms, alternatives, aspects, examples, or claims described in the following invention(s) may be combined logically, reasonably, and properly to form a specific method.

Any sentence, paragraph, (sub)-bullet, point, action, behaviors, terms, alternatives, aspects, examples, or claims described in the following invention(s) may be implemented independently and separately to form a specific method.

Dependency, such as "based on", "more specifically", "preferably", "in one embodiment", "in one alternative", "in one example", "in one aspect", "in one implementation", etc., in the present disclosure is just one possible example which would not restrict the specific method.

Satellite ephemeris information may contain information about orbital mechanics of all commercial satellites that are publicly available from multiple sources. This information is used by astronomers to describe the location and orbital behavior of stars and any other astronomic bodies.

In some implementations, the satellite ephemeris information is expressed in an American Standard Code for Information Interchange (ASCII) file using Two-Line Element (TLE) format. The TLE data format may encode a list of orbital elements of an Earth-orbiting object in two 70-column lines. The TLE format may be an expression of mean orbital parameters as "True Equator, Mean Equinox" (TEME) coordinates, thus filtering out short term perturbations.

From its TLE format data, the SGP4 (Simplified General Propagation 4) model may be used to calculate the location of a space object revolving about the earth in TEME coordinates. FIG. 1 illustrates a schematic diagram of Earth-Centered Earth-Fixed (ECEF) coordinates 10 in relation to latitude φ and longitude λ, according to an example implementation of the present disclosure. As shown in FIG. 1, it may be converted into the Earth-Centered, Earth-Fixed (ECEF) Cartesian x, y, z coordinate system as a function of time.

In some implementations, an example of satellite ephemeris information converted into ECEF format for the Telestar-19 satellite is shown below in Table 1.

Specifically, given a specific point in time, it is straightforward to calculate the satellite location by interpolation. The example given above refers to a GEO satellite, in which the epoch interval is 5 minutes. For LEO satellites, the intervals may be much shorter, on the order of seconds.

Examples of some selected terms are provided as follows.

gNB: This may mean a node that provides NR user plane and control plane protocol terminations towards the UE and is connected to the 5GC via the NG interface.

Msg1: This may mean a preamble transmission of the random-access (RA) procedure for a 4-step RA type.

Msg3: This may mean a first scheduled transmission of the RA procedure.

MsgA: This may mean preamble and payload transmissions of the RA procedure for a 2-step RA type.

MsgB: This may mean a response to the MsgA in the 2-step RA procedure. MsgB may consist of one or more responses for contention resolution, one or more fallback indications, and a backoff indication.

Numerology: This may correspond to one subcarrier spacing in the frequency domain. By scaling a reference subcarrier spacing by an integer N, different numerologies may be defined.

LEO: This may mean an orbit around the Earth with an altitude between 300 km and 1500 km.

NTNs: This may mean networks, or segments of networks, using an airborne or space-borne vehicle to carry a transmission equipment relay node or a base station (BS).

NTN-gateway: This may mean an earth station or a gateway being located at the surface of Earth and providing sufficient radio frequency (RF) power and RF sensitivity for accessing a satellite. NTN Gateway is a transport network layer (TNL) node.

Satellite: This may mean a space-borne vehicle embarking a bent pipe payload or a regenerative payload telecommunication transmitter, placed into Low-Earth Orbit (LEO), Medium-Earth Orbit (MEO), or Geostationary Earth Orbit (GEO).

HARQ information: This may be used for Downlink Shared Channel (DL-SCH), Uplink Shared Channel (UL-SCH), or Sidelink Shared Channel (SL-SCH) transmissions and may include a New Data Indicator (NDI), Transport Block Size (TBS), Redundancy Version (RV), and HARQ process ID.

Dormant BWP: This may be one of the downlink (DL) Bandwidth Parts (BWPs) configured by the network via dedicated RRC signaling. In the dormant BWP, the UE may stop monitoring PDCCH on/for the Secondary Cell (SCell) and continue performing CSI measurements, Automatic Gain Control (AGC), and beam management, if configured.

PDCCH occasion: This may mean a time duration (i.e., one or a consecutive number of symbols) during which the MAC entity is configured to monitor the PDCCH.

TABLE 1

| Epoch (day, hr, min, sec) | X [km] | Y [km] | Z [km] | dX/dt [km/s] | dY/dt [km/s] | dZ/dt [km/s] |
| --- | --- | --- | --- | --- | --- | --- |
| 2018 Oct. 26 02:00:00.000 | 19151.529 | −37578.251 | 17.682 | −0.00151 | −0.00102 | −0.00106 |
| 2018 Oct. 26 02:05:00.000 | 19151.073 | −37578.556 | 17.359 | −0.00152 | −0.00101 | −0.00109 |
| 2018 Oct. 26 02:10:00.000 | 19150.614 | −37578.855 | 17.029 | −0.00154 | −0.00099 | −0.00112 |
| 2018 Oct. 26 02:15:00.000 | 19150.150 | −37579.151 | 16.690 | −0.00155 | −0.00098 | −0.00114 |

Serving Cell: This may mean a PCell, a PSCell, or an SCell.

Timing Advance Group (TAG): This may mean a group of Serving Cells that may be configured by RRC messaging, where the cells with a UL configured may use a same timing reference cell and a same Timing Advance value. A Timing Advance Group containing the SpCell of a MAC entity is referred to as Primary Timing Advance Group (PTAG), whereas the term Secondary Timing Advance Group (STAG) refers to other TAGs.

Figure 2:
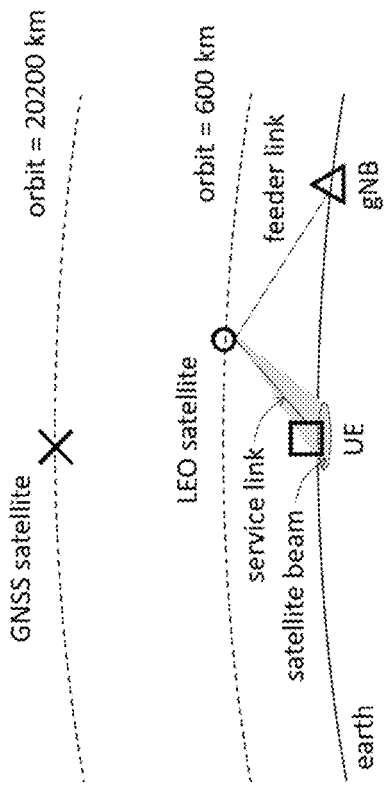
FIG. 2 illustrates a schematic diagram of an NTN with an LEO satellite of transparent payload at an orbit of 600 km, according to an example implementation of the present disclosure.

FIG. 2 illustrates a schematic diagram of an NTN 20 with an LEO satellite of transparent payload at an orbit of 600 km, according to an example implementation of the present disclosure. Specifically, NTN may refer to NWs, or segments of NWs, using a spaceborne vehicle for transmission, e.g., LEO satellites or GEO satellites. As shown in FIG. 2, a satellite access NW based on a satellite with a transparent payload is introduced.

In some implementations, the NTN 20 may include the following elements:
- A Ground (or 'Earth') Station including a Satellite-gateway and a Telemetry, Tracking and Command (TTC) unit. A Monitoring unit TTC link is out of the scope of the 3GPP realm.
- One or several Satellite-gateways (Sat-gateways) may be attached to a BS Base Band Unit (BBU) or a gNB that connects the NTN to a Core Network/Application Server. Node BBUs are close to Sat-gateways (e.g., either co-located or a few kilometers away). Antenna diversity may be required depending on geographical location and feeder-link frequency band.
- The satellite may be GEO or Non-GEO, and the satellite may be a part of a Satellite Constellation to ensure continuous services through one or several Sat-gateways. A Satellite Constellation Controller may provide each BS with satellite system data (e.g., satellite ephemeris information, satellite position, and velocity, etc.). The Satellite Constellation Controller may be linked to the TTC unit at least to retrieve the relevant satellite information, where the link to the TTC unit is implementation-dependent on or beyond the scope of 3GPP.
- A Feeder link, which is a radio link conveying information for a satellite mobile service between a Sat-gateway and the satellite.
- A service link or radio link between the UE and the satellite.
- A satellite, which implements a transparent payload. A transparent payload may perform radio frequency filtering, frequency conversion, and amplification. Hence, a waveform signal repeated by the payload is unchanged except for frequency translation and transmission power, which is set up according to the reference scenario (e.g., a GEO or LEO satellite) and associated link budget.
- The satellite may generate several spot-beams over a given service area bounded by its FOV or footprint. The footprints of the spot-beams may be an elliptic shape. The FOV of a satellite may depend on the onboard antenna design/configuration and the minimum elevation angle. The beamforming may be performed on the satellite or on the ground.
- A UE is served by the satellite within the targeted service area and may be capable of Global Navigation Satellite (GNSS) reception.
- Specifically, GNSS refers to the standard generic term for satellite navigation systems that provide autonomous geospatial positioning with global coverage. The GNSS may include, for example, the Global Positioning System (GPS), GLONASS, Galileo, Beidou, and other regional systems, and is usually operated at an orbit of 20200 km.

On K1/K2 Range Extension

In some implementations, the following may be introduced:
- For unpaired spectrum, extend the value range of K1 from (0 . . . 15) to (0 . . . 31).
- FFS: Whether there is an impact on the size of the PDSCH-to-HARQ_feedback timing indicator field in one DCI.

Specifically, the intention to extend the largest value of K1 from 15 to 30 in the PDSCH-to-HARQ-timing-indicator configured by RRC messaging may provide optimization for scheduling flexibility in a case that an NTN UE is operated in a TDD or a half-duplex FDD.

Support More than 16 HARQ

There is a problem that, if extending the value range of K1, it may only benefit scheduling flexibility but fail to support more than 16 HARQ multiplexing.

In some implementations, it may be proposed to add 1 bit or 2 bits for K1 indication by enlarging the size of an IE as a dl-DataToUL-ACK-r17. For example, for unpaired spectrum, it may be proposed to extend a size range of K1 from (1 . . . 8) to (1 . . . 16) when a UE camps on an NTN cell.

In some implementations, if the size range of K1 provided by the dl-DataToUL-ACK-r17 is smaller than an indication range provided by one DCI field, for example, K1 is configured from 0 to 15, a DCI format may only indicate from 0 to 31. When a UE receives a DCI format indicating a K1 value that is not configured in the dl-DataToUL-ACK-r17, then the UE may ignore the DCI format, or the UE may ignore the K1 value, or the UE may ignore the dl-DataToUL-ACK-r17 and apply a default value, e.g., 0-31.

In some implementations, if a HARQ-ACK codebook for the NTN is generated, the UE may not expect to be provided a K1 value which is not within the range provided by the dl-DataToUL-ACK-r17. The UE may receive the dl-DataToUL-ACK-r17 by an RRC message, including multiple K1 values from 1 to 16. The UE may determine the K1 value when a K1 indicator field is received in a DCI. A bit length of the K1 indicator field is determined based on how many K1 values are provided, and a bit value is used to indicate the K1 value provided by the dl-DataToUL-ACK-r17 in order. The K1 value indicates a slot number for a PUCCH transmission with HARQ-ACK information for PDSCH reception.

For example, there are two K1 values being provided by the dl-DataToUL-ACK-r17 via the RRC message, e.g., one is '0' that indicates a first entry of K1 values and the other is '1' that indicates a second entry of K1 values in the K1 indicator field in the DCI.

In some implementations, the dl-DataToUL-ACK-r17 may provide a list of timing for given PDSCH to an DL ACK. The field of the dl-DataToUL-ACK-r17 applies to a DCI format 1_1. The dl-DataToUL-ACK-r17 is a 'SEQUENCE' with a 'SIZE' from 1 to 16 of an 'INTEGER' from 0 to 32. The dl-DataToUL-ACK-r17 is a 'SetupRelease' and an 'OPTIONAL', and is used for unpaired spectrum for the NTN service.

In one implementation, the field of the dl-DataToUL-ACK-r17 with optional presence may be declared with the keyword OPTIONAL that identifies a field for which a value may be omitted. The omission carries semantics, which is different from any normal value of the field.

In one implementation, the usage of the parameterized 'SetupRelease' type is a function call in programming languages where the element type parameter is passed as a parameter. For example, a procedural text for the dl-DataToUL-ACK-r17 may be the following:

1> if dl-DataToUL-ACK-r17 is set to "setup";
   2> do something;
1> else (dl-DataToUL-ACK-r17 is set to "release");
   2> release dl-DataToUL-ACK-r17 (if appropriate).

In one implementation, for a DCI format 1_0, PDSCH-to-HARQ_feedback timing indicator field values may map to {1, 2, 3, 4, 5, 6, 7, 8}. In one implementation, for a DCI format, other than DCI format 1_0, scheduling a PDSCH reception or an SPS PDSCH release, the PDSCH-toHARQ_feedback timing indicator field values, if present, may map to values for a set of many slots provided by the following, for example, a dlDataToUL-ACK, a dl-DataToUL-ACK-r16, a dl-DataToUL-ACK-r17 or a dl-DataToUL-ACKForDCIFormat1_2, a dl-DataToUL-ACKForDCIFormat1_2-r17 as shown in Table 2.

In one implementation, if a UE has a HARQ-ACK, an SR, and a wideband or sub-band CSI report to transmit, the UE may determine a PUCCH resource with a PUCCH format 2. If the UE has a HARQ-ACK, an SR, and a wideband CSI report to transmit, the UE may determine a PUCCH resource with a PUCCH format 3 or a PUCCH format 4. Specifically, the UE may determine the PUCCH resource using the PUCCH resource indicator field in a last of many DCI formats with a value of a PDSCH-to-HARQ_feedback timing indicator field, if present, or a value of a dl-DataToUL-ACK, or a dl-DataToUL-ACK-r16, a dl-DataToUL-ACKForDCIFormat1_2, a dlDataToUL-ACK-r17 or a dl-DataToUL-ACKForDCIFormat1_2-r17 indicating a same slot for the PUCCH transmission, from a PUCCH resource set provided to the UE for HARQ-ACK transmission.

In one implementation, for a serving cell c, an active DL BWP, and an active UL BWP, the UE may determine a set of M occasions for candidate PDSCH receptions for which the UE can transmit corresponding HARQ-ACK informa-

TABLE 2

| PDSCH-to-HARQ_feedback timing indicator | | | | |
| --- | --- | --- | --- | --- |
| 1 bit | 2 bits | 3 bits | 4 bits | Number of slots k |
| '0' | '00' | '000' | '0000' | $1^{st}$ value provided by a dl-DataToUL-ACK, a dl-DataToUL-ACK-r16, a dl-DataToUL-ACKForDCIFormat1_2, a dl-DataToUL-ACK-r17 or a dl-DataToUL-ACKForDCIFormat1_2-rl7 |
| '1' | '01' | '001" | '0001' | $2^{nd}$ value provided by a dl-DataToUL-ACK, a dl-DataToUL-ACK-r16, a dl-DataToUL-ACKForDCIFormat1_2, a dl-DataToUL-ACK-r17 or a dl-DataToUL-ACKForDCIFormat1_2-r17 |
| | '10' | '010' | '0010' | $3^{rd}$ value provided by a dl-DataToUL-ACK, a dl-DataToUL-ACK-r16, a dl-DataToUL-ACKForDCIFormat1_2, a dl-DataToUL-ACK-r17 or a dl-DataToUL-ACKForDCIFormat1_2-r17 |
| [the same logic for the $4^{th}$ to $15^{th}$ values] | | | | |
| | | | '1111' | $16^{th}$ value provided by a dl-DataToUL-ACK, a dl-DataToUL-ACK-r16, a dl-DataToUL-ACKForDCIFormat1_2, a dl-DataToUL-ACK-r17 or a dl-DataToUL-ACKForDCIFormat1_2-r17 |

In one implementation, if the UE detects a DCI format that does not include a PDSCH-to-HARQ_feedback timing indicator field and schedules a PDSCH reception or activates an SPS PDSCH reception ending in a slot n, the UE may provide corresponding HARQ-ACK information in a PUCCH transmission within a slot n+k, where k is provided by a dl-DataToUL-ACK, or a dlDataToUL-ACK-r16, a dlDataToUL-ACK-r17, a dl-DataToUL-ACKForDCIFormat1_2, or a dl-DataToUL-ACKForDCIFormat1_2-r17.

In one implementation, a PUCCH transmission with HARQ-ACK information, a UE may determine a PUCCH resource after determining a set of PUCCH resources for $O_{UCI}$ HARQ-ACK information bits. The PUCCH resource determination is based on a PUCCH resource indicator field, if present, in the last DCI format, among the DCI formats that have a value of a PDSCH-to-HARQ_feedback timing indicator field, if present, or a value of a dlDataToUL-ACK, or a dl-DataToUL-ACK-r16, a dl-DataToUL-ACKForDCIFormat1_2, a dlDataToUL-ACK-r17 or a dl-DataToUL-ACKForDCIFormat1_2-r17, indicating a same slot for the PUCCH transmission. A UE may detect the PUCCH transmission to transmit corresponding HARQ-ACK information. For PUCCH resource determination, detected DCI formats may be first indexed in ascending order across serving cells indexes for a same PDCCH monitoring occasion and may be indexed in ascending order across PDCCH monitoring occasion indexes.

tion in a PUCCH and in a slot n. If the serving cell c is deactivated, the UE may use the active DL BWP for determining the set of M occasions for candidate PDSCH receptions, where the DL BWP is provided by a firstActiveDownlinkBWP-Id. The determination (of the set of M occasions for candidate PDSCH receptions for which the UE can transmit corresponding HARQ-ACK information in a PUCCH and in a slot n) may be based on a set of slot timing values K1 associated with the active UL BWP. If the UE is configured to monitor one PDCCH for DCI format 1_0 and is not configured to monitor one PDCCH for either DCI format 1_1 or DCI format 1_2 on the serving cell c, K1 is provided by the slot timing values {1, 2, 3, 4, 5, 6, 7, 8}.

In one implementation, for an NTN UE and unpaired spectrum, K1 may have default slot timing values as [2, 4, 6, 8, 10, 12, 14, 16] or values other than [1-8], e.g., K1_NTN [9, 10, . . . , 31]. The NW may provide different default values via RRC configurations. For example, if an NTN UE is determined through initial access/RA procedure, the K1 may be provided by PDSCH-to-HARQ_feedback timing indicator field values mapping to a K1_NTN in a DCI format 1_0. Specifically, the K1_NTN may be pre-defined, configured, or indicated.

In one implementation, if the UE is configured to monitor one PDCCH for a DCI format 1_1 and is not configured to monitor one PDCCH for a DCI format 1_2 for a serving cell c, K1 is provided by a dl-DataToUL-ACK or a dl-Data-ToUL-ACK-r17.

In one implementation, if the UE is configured to monitor one PDCCH for a DCI format 1_2 and is not configured to monitor one PDCCH for a DCI format 1_1 for a serving cell c, K1 is provided by a dl-DataToUL-ACK-ForDCIFormat1_2 or a dl-DataToUL-ACK-ForDCIFormat1_2-r17.

In one implementation, if the UE is configured to monitor one PDCCH for a DCI format 1_1 and a DCI format 1_2 for a serving cell c, K1 is provided by the union of a dl-DataToUL-ACK (or a dl-DataToUL-ACK-r17) and a dl-DataToUL-ACK-ForDCIFormat1_2 (or a dl-DataToUL-ACK-ForDCIFormat1_2-r17).

In one implementation, if the UE is provided a dl-DataToUL-ACK, a dl-DataToUL-ACK-r17, a dl-DataToUL-ACK-ForDCIFormat1_2, or a dl-DataToUL-ACK-ForDCIFormat1_2-r17, the UE may not expect to be provided a DCI format 1_0 with a slot timing value for transmission of HARQ-ACK information that does not belong to the intersection of the set of slot timing values {1, 2, 3, 4, 5, 6, 7, 8} and the set of slot timing values provided by K1 for the active DL BWP of a corresponding serving cell.

In one implementation, a DCI format 1_1 is used for scheduling a PDSCH in one cell. The following information is transmitted using the DCI format 1_1 with CRC scrambled by a C-RNTI or a CS-RNTI or an MCS-C-RNTI, where a PDSCH-to-HARQ_feedback timing indicator may be 0, 1, 2, or 3 bits. The bit-width for this field is determined as $\lceil \log 2(I) \rceil$ bits, where I is a number of entries in a higher layer parameter as a dl-DataToUL-ACK or a dl-DataToUL-ACK-r17.

Coexist with Rel-15 and Rel-16

In 3GPP Release 16 (Rel-16), a dl-DataToUL-ACK has been extended from (0 . . . 15) to (−1 . . . 15) to support non-numeric K1 for NR-U. A new IE dl-DataToUL-ACK-r16 may be used to differentiate it from another IE dl-DataToUL-ACK. If a new IE dl-DataToUL-ACK-r17 is introduced, a problem occurs how to deal with coexistence with Rel-16 IE and Rel-15 IE. If a new field with adding bits is introduced for scheduling HARQ-ACK information in response to NTN data, another problem may affect DCI size alignment procedure.

In some implementations, when a conflict occurs as previously mentioned, a UE may ignore one of the configurations. In one implementation, if a dl-DataToUL-ACK-r17 is signaled, a UE may ignore the dl-DataToUL-ACK. In one implementation, if a dl-DataToUL-ACK-r17 is signaled, a UE may ignore the dl-DataToUL-ACK-r16. In one implementation, if a dl-DataToUL-ACK-r17 is signaled for the NR-U service, a value greater than 16 corresponds to a non-numerical value for the case where the ACK/NACK feedback timing is not explicitly included at a time of scheduling PDSCH.

In one implementation, a dl-DataToUL-ACK may provide a list of timing for a given PDSCH to a DL ACK. A field of the dl-DataToUL-ACK applies to a DCI format 1_1. The dl-DataToUL-ACK is a 'SEQUENCE' with a 'SIZE' from 1 to 8 of an 'INTEGER' from 0 to 16.

In one implementation, a dl-DataToUL-ACK-r16 provides a list of timing for a given PDSCH to the DL ACK. A field of the dl-DataToUL-ACK-r16 applies to the DCI format 1_1. The dl-DataToUL-ACK-r16 is a 'SEQUENCE' with a 'SIZE' from 1 to 8 of an 'INTEGER' from −1 to 16. The value −1 corresponds to the non-numerical value for the case where the A/N feedback timing is not explicitly included at a time of scheduling PDSCH. If a higher layer parameter as a dl-DataToUL-ACK-ForDCIFormat1_2-r17 is configured or if a bit width of the PDSCH-to-HARQ_feedback timing indicator in a DCI format 1_2 for one HARQ-ACK codebook is not equal to that of the PDSCH-to-HARQ_feedback timing indicator in a DCI format 1_2 for the other HARQ-ACK codebook, a number of most significant bits with value set to '0' may be inserted to a smaller PDSCH-to-HARQ_feedback timing indicator until the bit width of the PDSCH-to-HARQ_feedback timing indicator in the DCI format 1_2 for the two HARQ-ACK codebooks are the same.

Support of DCI Format 1_2

In Rel-16, a DCI format 1_2 is used for URLLC, and a corresponding K1 value is configured by the IE as a DL-DataToUL-ACK-DCI-1-2 via an RRC message. There is a problem that it is unclear whether a range of the K1 value of the DCI format 1-2 shall be extended.

In some implementations, it may introduce a new IE as a DL-DataToUL-ACK-DCI-1-2-r17 to support a DCI format 1_2 in NTN for unpaired spectrum.

In one implementation, the dl-DataToUL-ACK-DCI-1-2-r17 may provide a list of timing for a given PDSCH to the DL ACK. A field of a dl-DataToUL-ACK-r17 may apply to a DCI format 1_2. The dl-DataToUL-ACK-DCI-1-2-r17 may be a 'SEQUENCE' with a 'SIZE' from 1 to 16 of an 'INTEGER' from 0 to 32. The dl-DataToUL-ACK-DCI-1-2-r17 may be 'SetupRelease' and 'OPTIONAL' for unpaired spectrum in an NTN cell.

In one implementation, if the dl-DataToUL-ACK-DCI-1-2-r17 is signaled, a UE may ignore a dl-DataToUL-ACK-DCI-1-2.

In one implementation, the dl-DataToUL-ACK-DCI-1-2 may provide a list of timing for given PDSCH to the DL ACK. A field of the dl-DataToUL-ACK-r17 may apply to the DCI format 1_2. The dl-DataToUL-ACK-DCI-1-2 may be a 'SEQUENCE' with a 'SIZE' from 1 to 8 of an 'INTEGER' from 0 to 16.

In one implementation, the DCI format 1_2 may be used for scheduling a PDSCH in one cell. Specifically, some following information may be transmitted using the DCI format 1_2 with CRC scrambled by a C-RNTI or a CS-RNTI or an MCS-C-RNTI:

PDSCH-to-HARQ_feedback timing indicator may be 0, 1, 2, or 3 bits, as defined in TS 38.213, where a bit-width for this field is determined as $\lceil \log 2(I) \rceil$ bits, I is a number of entries in the higher layer parameter as a DL-DataToUL-ACK-DCI-1-2 or a DL-DataToUL-ACK-DCI-1-2-r17.

In one implementation, if the UE is configured to monitor one PDCCH for a DCI format 1_1 and a DCI format 1_2 for one serving cell c, K1 may be provided by the union of a dl-DataToUL-ACK, a dl-DataToUL-ACK-ForDCIFormat1_2, and a DL-DataToUL-ACK-DCI-1-2-r17.

Timing Relationship of TAC

In some implementations, a parameter K_offset may be introduced to enhance the adjustment of UL transmission timing upon the reception of a corresponding TAC.

Introducing the K_offset for the TAC may prevent an error case that an action time of the TAC is earlier than a reception time of the TAC. In Rel-16, the action of the TAC is specified in TS 38.213 as below.

3GPP TS 38.213 V16.4.0 (2020 December), 4.2 Transmission timing adjustments:

For a TAC received on an UL slot n and for a transmission other than a PUSCH scheduled by a RAR UL grant or a fallbackRAR UL grant, or a PUCCH with HARQ-ACK information in response to a successRAR, the corresponding adjustment of the UL transmission timing applies from the beginning of an UL slot n+k+1, where $k=\lceil N_{slot}^{subframe,\mu} \cdot (N_{T,1}+N_{T,2}+N_{TA,max}+0.5)/T_{sf} \rceil$, $N_{T,1}$ is a time duration in msec of $N_1$ symbols corresponding to a PDSCH processing time for a UE processing capability 1, as specified in TS 38.214, when additional PDSCH DM-RS is configured, $N_{T,2}$ is a time duration in msec of $N_2$ symbols corresponding to a PUSCH preparation time for the UE processing capability 1, $N_{TA, max}$ is a maximum TA value in msec that can be provided by a TA command field of 12 bits, $N_{slot}^{subframe,\mu}$ is a number of slots per subframe, and $T_{sf}$ is a subframe duration of 1 msec.

Figure 3:
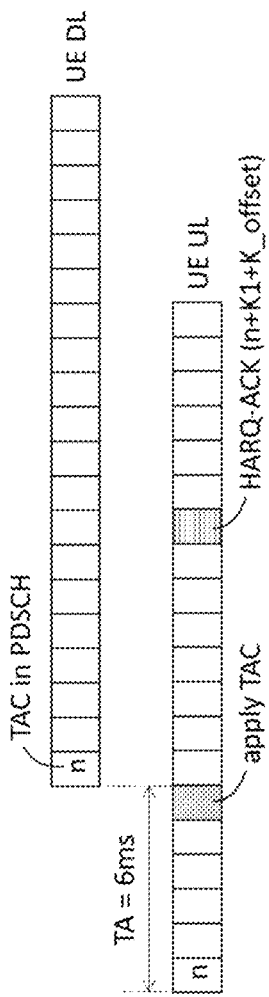
FIG. 3 illustrates a schematic diagram of an error case applying one received Timing Advance Command (TAC) with a previous TA=6 ms, according to an example implementation of the present disclosure.

FIG. 3 illustrates a schematic diagram of an error case 30 applying one received TAC with a previous TA=6 ms, according to an example implementation of the present disclosure. Specifically, a maximum value of k is less than 4 ms, where $N_{T,1}<1$ ms (13 symbols), $N_{T,2}<1$ ms (10 symbols), and $N_{TA,max} \leq 2$ ms. When a UE applies a TA value larger than or equal to 6 ms, an error case may happen as shown in FIG. 3.

The error case is that the UE may apply the TAC before receiving it, which is infeasible. Accordingly, it is proposed to add the K_offset.

Support of the Open-Loop Control for UL Timing

If the combination of both open and closed control loops is supported, there may be a chance that a new TA adjustment value is greater than a maximum TA value provided by a TAC of 12 bits. As such, a UE may need to transmit a PUSCH applied to the new TA before the new TA is known to the UE.

In some implementations, there are some solutions to be considered as follows:
1) Introducing a new maximum TA value regarding the combination of both open and closed control loops;
2) Setting up restriction to avoid any TA update beyond the maximum TA;
3) Handling this as an error case such that UE may drop the HARQ-ACK if the received TA command cannot be applied due to insufficient processing time.

In one implementation, an $N_{TA, max}$ is the maximum timing advance value in msec that may be provided by a TAC field of 12 bits if N-TA-max-R17 is not provided by an RRC message.

In one implement, if an N-TA-max-R17 is provided, the $N_{TA, max}$ is the maximum TA value in msec that may be provided by a combination of the following elements:
1) a TAC field of 12 bits or 6 bits associated with $N_{TA}$;
2) an RRC message indicating a common TA associated with $N_{TA,common}$; and
3) an update of a UE-calculated TA based on GNSS and satellite ephemeris information (or shortly called ephemeris) associated with $N_{TA,UE-specific}$.

In one implementation, if two adjacent slots overlap due to a TAC, the latter slot is reduced in duration relative to the former slot. If more than two adjacent slots overlap due to a TAC or TA change by a UE, there may be some alternatives/solutions as follows:
1) the latter slot is reduced in duration relative to the former slot in the case that a UE and an NW have a misunderstanding on schedule; and
2) the former slot is reduced in duration relative to the latter slot in the case that the NW cannot receive the former slot anymore.

In one implementation, if a common TA is provided, or if a UE-calculated TA is enabled, the UE may change UL timing by a TAC, a common TA, or a UE-calculated TA. Any TA change within a given duration configured by the NW or pre-determined by the UE may be smaller than or equal to the maximum TA value provided by a TAC of 12 bits.

DL and UL being Aligned at a Satellite

In some implementations, one proposal may be introduced to focus on whether to prioritize NTN designs that support systems where DL and UL are aligned at the gNB.

Figure 4:
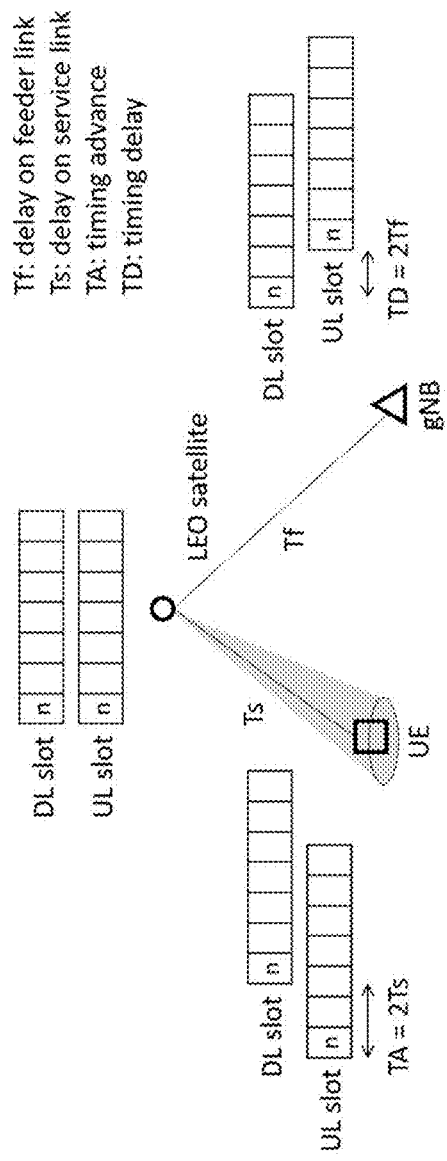
FIG. 4 illustrates a schematic diagram of UL and DL timing alignments of one satellite, according to an example implementation of the present disclosure.

FIG. 4 illustrates a schematic diagram of UL and DL timing alignments 40 of one satellite, according to an example implementation of the present disclosure. As shown in FIG. 4, this proposal intends to deprioritize systems where DL and UL are misaligned at the gNB, which may happen when the UL RX and DL TX frames are aligned only at the satellite.

In some implementations, DL, UL, and SL transmissions may be organized into frames with $T_f=(\Delta f_{max}N_f/100) \cdot T_c=10$ ms duration, each including ten subframes of $T_{sf}=(\Delta f_{max}N_f/1000) \cdot T_c=1$ ms duration. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 including subframes 0-4 and half-frame 1 including subframes 5-9. There is one set of frames in the UL and one set of frames in the DL on a carrier. UL frame number i for transmission from the UE may start considering $TT_A=(N_{TA}+N_{TA,offset}+N_{TA,adj}^{common}+N_{TA,adj}^{UE}) \times T_c$ before the start of the corresponding DL frame at the UE, where $T_{TA}$ may be total TA;
$N_{TA}$ may be a TA variable maintained by the UE;
$N_{TA,offset}$ may be a TA offset for a TA variable;
$N_{TA,adj}^{common}$ may be a common TA; and
$N_{TA,adj}^{UE}$ may be a UE-specific TA.

Specifically, $N_{TA}$ and $N_{TA,offset}$ are given by TS 38.213, clause 4.2, except for MsgA transmission on PUSCH where $N_{TA}=0$ shall be used. $N_{TA,adj}^{common}$ is derived from the higher-layer parameters TACommon, TACommonDrift, and TACommonDriftVariation, if configured; otherwise, $N_{TA,adj}^{common}=0$. $N_{TA,adj}^{UE}$ is computed by the UE based on UE position and serving-satellite-ephemeris-related higher-layers parameters, if configured; otherwise, $N_{TA,adj}^{UE}=0$.

Timing Alignment on MAC Layer Timers

If UL and DL timing are misaligned at a gNB, various timers defined in the MAC layer may need to be reconsidered. It is essential between a UE and a gNB to have a common understanding about when to start or stop timers maintained by (in) a MAC entity, e.g., MAC-level timers. Also, the detail of timing delay (TD) on feeder TD is unclear.

In some implementations, an offset to postpone a UE for starting MAC layer timers may be introduced.

In one implementation, the offset may be associated with the following:
1) the TD between a DL slot and an UL slot at the gNB side;
2) a maximum or minimum value of the TD in a serving cell; and
3) a fixed value between the maximum and minimum values of the TD in a serving cell.

In one implementation, a TD may be configured in a TAG associated with a TAC or configured in a common TAG that includes multiple TAGs.

In some implementations, upon reception of a TAC or a common TA value carrying the TD configured by a NW for a TAG or multiple TAGs, the UE may adjust UL timing for PUSCH/SRS/PUCCH transmission on all the serving cells in the TAG(s) based on a given value that the UE expects to be the same for all the serving cells in the TAG(s) and based on the received TAC or the received common TA value where the UL timing for PUSCH/SRS/PUCCH transmissions is the same for all of the serving cells in the TAG(s). It is noted that the TD may be broadcast by the gNB via SI or via DL dedicated signaling. In some implementations, the UE may receive more than one TD via different signaling. In one example, the UE may receive a first TD via SIB and receive a second TD via dedicated signaling. Specifically, the first TD may be applied by the UE for UL transmission regarding a RA procedure and the second TD may be applied by the UE for UL transmission regarding any UL transmission except for the RA procedure.

In some implementations, once the UE receives the first TD via the SIB and does not receive the second TD via dedicated signaling, the first TD may be conditionally applied by the UE for any UL transmission except for a RA procedure.

In one implementation, the TD may be derived based on a UE-gNB RTT (i.e., the sum of the UE's TA value (e.g., total TA) and a scheduling offset (e.g., K_mac) provided in an NTN configuration).

In one implementation, the TD may be based on a total TA and a scheduling offset (e.g., K_mac).

In one implementation, the total TA may be based on at least one of the TA variable, the TA offset for the TA variable, the common TA, and the UE-specific TA.

In one implementation, if a Msg3 is transmitted, the UE may start a ra-ContentionResolutionTimer and restart the ra-ContentionResolutionTimer at each HARQ retransmission in a first symbol after an offset associated with the TD from the end of the Msg3 transmission.

In one implementation, for HARQ processes with a DL HARQ feedback enabled, a drx-HARQ-RTT-TimerDL length is increased by an offset (i.e., existing values within a value range increased by the offset). The offset is associated with the TD.

In one implementation, if a drx-HARQ-RTT-TimerDL expires or if data of the corresponding HARQ process is not successfully decoded, it may propose to start a drx-RetransmissionTimerDL for the corresponding HARQ process in a first symbol after an offset associated with the TD from the expiry of the drx-HARQ-RTT-TimerDL.

In one implementation, if a drx-HARQ-RTT-TimerUL (or a DRX HARQ RTT timer) expires, it may propose to start the drx-RetransmissionTimerUL for the corresponding HARQ process in a first symbol after an offset associated with the TD from the expiry of the drx-HARQ-RTT-TimerUL. In one implementation, once the UE receives a DL assignment indicating a DL data reception with a HARQ process, the UE may perform corresponding the DL data reception with the HARQ process, and the UE may perform corresponding HARQ feedback. Once the HARQ feedback is transmitted, the UE may start a drx-HARQ-RTT-TimerDL after an offset associated with the TD.

In one implementation, an offset for initiation of a ra-ResponseWindow for the NTN may be introduced, where the offset is associated with the TD.

In one implementation, if an RA Preamble is transmitted and regardless of the possible occurrence of a measurement gap, a MAC entity may start the ra-ResponseWindow/msgB-ResponseWindow configured in a RACH-ConfigCommon or a RACH-Configdedicated at a first PDCCH occasion after an offset associated with the TD from the end of the RA Preamble transmission. It may propose to monitor the PDCCH of the SpCell for RAR(s) identified by an RA-RNTI while an raResponseWindow is running.

In one implementation, once a MsgA preamble is transmitted, regardless of the possible occurrence of a measurement gap, the MAC entity may start a msgB-ResponseWindow at the PDCCH occasion after an offset associated with the TD from the end of the MsgA transmission and monitor the PDCCH of the SpCell for a RAR identified by a MsgB-RNTI while the msgBResponseWindow is running.

In one implementation, the value of t-Reassembly may be extended based on a UE-specific round-trip delay (RTD), the number of allowed HARQ-retransmission attempts (e.g., nrof_HARQ_retrans), as well as a configurable offset to account for possible delays on a UE and a NW (e.g., scheduling_offset). The extended value may be associated with the TD.

In one implementation, the NW may configure the same TD across all UL CCs. When the NW performs resource scheduling, the NW may assume the TD is equal to zero to determine whether an overlap happens or to ensure a UE processing time or determine HARQ-Ack codebook bits.

Initial TA and TA Maintenance

In some implementations, the following agreement may be introduced:

For a TA update in an RRC_CONNECTED state, a combination of both open-loop TA control (e.g., UE autonomous TA estimation and common TA estimation) and closed-loop TA control (e.g., received TACs) may be supported for the NTN.

In one implementation, the motivation to support the combination of the open-loop TA control and the closed loop TA control may include the following:

1) to ensure that UL time synchronization errors for a TA update in the RRC_CONNECTED state may not violate limits imposed by C; and
2) to prevent signaling overhead from using timing adjustment commands due to the satellite movement.

In one implementation, as specified in TR 38.811, if there is no open loop TA control, the required number of TACs to be sent is about 10 per second for a 15 kHz SCS case:
3GPP TR 38.811 V15.4.0 (2020 September):
With normal CP, it may expect this maximum step not to exceed the normal CP length (e.g., CP length is 4.7 μs in a 15 kHz SCS case). It means that the number of TACs to be sent per second to track the maximum drift of 35 μs/s is about 10 per second for a 15 kHz SCS case, 40 per second for a 60 kHz SCS, and 80 per second for a 120 kHz SCS case.

In some implementations, since the closed-loop TA control is already a feasible solution, the combination of the open-loop TA control and the closed-loop TA control may provide sufficient benefits at least to reduce certain signaling overhead.

In one implementation, the TA applied by an NR NTN UE may be given by:

$$T_{TA} = (N_{TA} + N_{TA,UE\text{-}specific} + N_{TA,common} + N_{TA,offset}) \times T_c$$

For TA maintenance, the UE may update $N_{TA}$ based on a closed-loop mechanism and update ($N_{TA,UE\text{-}specific}$+$N_{TA,common}$) based on an open-loop mechanism, where $N_{TA}$ is a TA variable maintained by the UE, $N_{TA,UE\text{-}specific}$ is a UE-specific TA, $N_{TA,common}$ is a common TA updated by the NW, and $N_{TA,offset}$ is a TA offset for the TA variable.

Details of the Combination of Open-Loop and Closed-Loop TA Control

It is still unclear how the combination of open-loop TA control and closed-loop TA control may cooperate based on the current NR framework. The interaction between the open-loop TA control and closed-loop TA control may have certain conflicts.

Figures 5A, 5B:
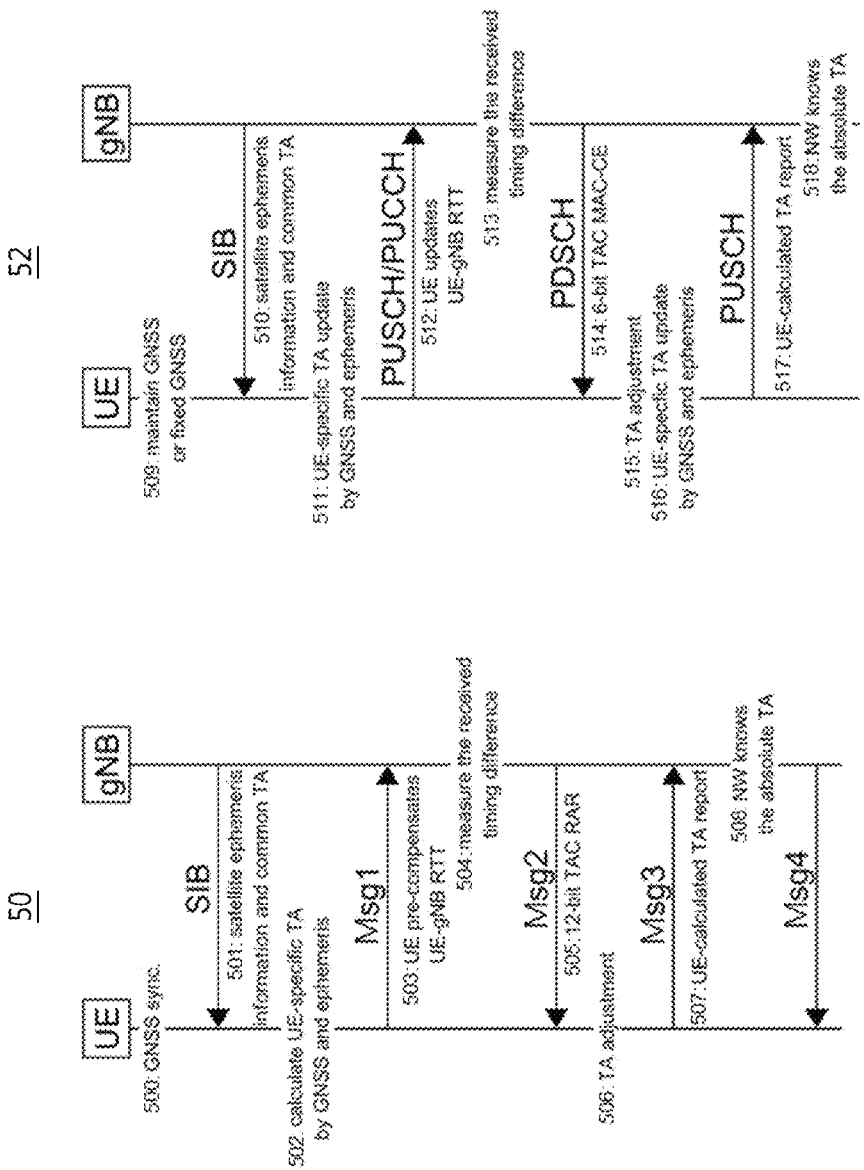
FIG. 5A is a flowchart illustrating a process for an initial Timing Advance (TA) in an RRC_IDLE state or an RRC_INACTIVE state, according to an example implementation of the present disclosure.
FIG. 5B is a flowchart illustrating a process for a maintenance TA in an RRC_CONNECTED state, according to an example implementation of the present disclosure.

FIG. 5A is a flowchart illustrating a process 50 for an initial TA in an RRC_IDLE state or an RRC_INACTIVE state, according to an example implementation of the present disclosure. FIG. 5B is a flowchart illustrating a process 52 for a maintenance TA in an RRC_CONNECTED state, according to an example implementation of the present disclosure. As shown in FIG. 5A and FIG. 5B, A scenario for the combination of the open-loop TA control and the closed-loop TA control under all RRC states is also possible.

As shown in FIG. 5A for the initial TA, process 50 may introduce some procedures that are different from the legacy TA, as follows:

Action 500: A UE may ensure GNSS is ready. Specifically, a GNSS Time To First Fix (TTFF) may take 1 second (hot fix if GNSS ephemeris is known with the last TTFF within 4 hours) or less than 5 seconds (warm start if GNSS Almanac known with the last TTFF within 180 days). GNSS-acquired UE location may be used for cell selection and reselection combining with the serving cell and nearby satellite ephemeris information.

In one implementation, a UE may not trigger GNSS synchronization all the time due to power-saving concerns. In one implementation, the UE may trigger, measure, or track GNSS synchronization when at least one of the following happens:

1) an RA procedure having been triggered/initiated;
2) a configured GNSS measurement window starting provided by a NW, e.g., a SIB1, as a GNSS measurement gap configuration;
3) the UE camping on an NTN cell; and
4) a UE-specific report being triggered, e.g., by an NW request or periodically.

Action 501: The NW may broadcast satellite ephemeris information and common TA $N_{TA,common}$ (for TA uncertainty and feeder link delay), and TA offset $N_{TA,offset}$ by sending a SIB1 or an NTN SIB if a size of the SIB1 is not enough for satellite ephemeris information.

In one implementation, UE may not know whether the common TA includes TA uncertainty. Therefore, the SIB1 may carry an indication to indicate whether TA uncertainty has been included. If the TA uncertainty is known to the UE, the UE may not delay a TA margin, e.g., half of CP, to transmit a PRACH preamble that has applied a TA value; otherwise (if the TA uncertainty is not included in common TA and the UE is unknown theta uncertainty), the UE may delay the TA margin to transmit the PRACH preamble.

Action 502: The UE may calculate a UE-satellite RTT by satellite ephemeris information and GNSS-acquired UE location as $N_{TA,UE-specific}$.

In one implementation, the satellite ephemeris information may be outdated due to a longer RTT. Therefore, the satellite ephemeris information may include timing information, e.g., the satellite ephemeris information is used for a particular time, for the UE to predict the current satellite location used for calculating the UE-satellite RTT.

In one implementation, the GNSS-acquired UE location may be outdated due to UE movement, e.g., on a flight. Therefore, the UE may predict a current UE location based on UE movement, e.g., fast (mounted device), normal (handheld), or fixed (e.g., VAST).

Action 503: The UE may apply a value as $N_{TA,UE-specific}+N_{TA,common}+N_{TA,offset}$ for the TA to send Msg1.

In one implementation, the selected RACH occasion for the Msg1 may not be able to apply the calculated TA. Therefore, in that case, the UE may select the next RACH occasion. The NW may provide assistance information that provides a minimum time gap between an SSB and a proper RACH occasion.

In one implementation, the UE may not know whether to use $N_{TA,UE-specific}$ or $N_{TA,common}$ for sending Msg1. The UE may determine whether to use $N_{TA,UE-specific}$ based on the following: 1) an NTN cell indication in a SIB1; or 2) a PLMN ID. The UE may determine whether to use $N_{TA,common}$ based on the following: 1) whether $N_{TA,common}$ is provided in a SIB1. If $N_{TA,common}$ is not configured, a default value is zero; or 2) an indication of whether the UL and DL timing alignment is set to a gNB; if the indication is not configured, a default is set to the gNB.

Action 504: The NW may measure the timing difference between the Msg1 reception and a configured RO. In one implementation, the Msg1 may be located within the CP, and the NW may not receive the Msg1 before the configured RO, to prevent issues when using a TA adjustment via a 12-bit TAC.

In one implementation, a timing error of the Msg1 may be greater than the CP limit. If the NW has multiple FFT windows to receive a timing range of the Msg1, the Msg1 may be decoded successfully. In this case, an indication of whether the NW can decode an Msg1 with a timing error greater than the CP limit may be provided in a SIB1.

In one implementation, the timing error of the Msg1 may lead to the Msg1 reception time before the configured RO. Under such scenario/situation, if the NW can still decode the Msg1, the 12-bit TAC may need the following: 1) a negative value, which may be supported by using a reserved value in the 12-bit TAC, e.g., the current TA values are {0, 1, 2, ..., 3846} indicated by using 12 bits, and when all TA values (i.e., 3847) are used, then it may imply a negative TA value; 2) triggering the UE to apply the TA margin value, e.g., half of CP via an indication or a reserved TA value, e.g., 3847.

Action 505: The NW may send Msg2 carrying the 12-bit TAC in a RAR based on the Msg1 reception.

In one implementation, the UE may not apply the TA margin to prevent using a negative TA value. Therefore, the NW may have a timing delay, e.g., half of CP, between a UL slot and a DL slot to ensure the Msg1 reception can be received after a configured RO. The NW may broadcast if the timing delay for the TA margin is used.

Action 506: The UE may adjust the TA by the value of $N_{TA}+(N_{TA,UE-specific}+N_{TA,common}+N_{TA,offset})$, where $N_{TA}$ is carried from the 12-bit TAC in a RAR.

In one implementation, $N_{TA,UE-specific}$ may be outdated due to UE/satellite movement. Therefore, the UE may update a value of $N_{TA,UE-specific}$ and the value may be different from the one used for sending the Msg1. UE may determine whether to update $N_{TA,UE-specific}$ if an indication is provided by the NW or by default.

In one implementation, $N_{TA}$ may be outdated regarding the propagation delay for sending the 12-bit TAC. Therefore, UE may predict the current $N_{TA}$ if an indication is provided by the NW or by default.

Action 507: The UE may apply an adjusted TA as $N_{TA}+(N_{TA,UE-specific}+N_{TA,common}+N_{TA,offset})$ for Msg3 transmission. If a Msg3 has sufficient payload size, the UE may report the UE-calculated TA $N_{TA,UE-specific}$ or UE-acquired location in the Msg3; otherwise, the UE may report $N_{TA,UE-specific}$ in a Msg5 or other UL grants after Msg3.

In one implementation, the NW may not know how UE compensates $N_{TA}$. Therefore, to reach the same understanding of the timing between the NW and the UE, UE may report the adjusted TA or the total TA that is applied for the UL transmission that carries the TA report.

In one implementation, the UE may need additional processing time if the TA report includes the current TA value. Therefore, to reduce complexity, UE may report $N_{TA,UE\text{-}specific}$ used for sending the Msg1, regardless as to whether the TA report is carried via the Msg3 or the Msg5 or other UL grants.

In one implementation, the Msg3 may have a limited payload size. To report the TA in the Msg3, all UEs may select the RA Preamble group B rather than RA Preamble group A to request a larger size for the Msg3 when path loss is less than a parameter 'PCMAX'. Therefore, when both RA Preamble groups A and B are configured, the NW may indicate to the UE to randomly select the RA Preamble group A or B for blocking some UEs from selecting the RA Preamble group B to balance the usage of the RA preamble groups.

In one implementation, the TA report may not contain an accurate UE location. Therefore, UE may indicate whether a UE location report is allowed via an RRC message to the NW. The UE may report a physical cell ID decoded from an SSB or a timestamp associated with a UL slot, or a SFN as a replacement for the accurate UE location.

Action 508: The NW may know the absolute TA, i.e., the UE-gNB RTT as the sum of the UE's TA value (e.g., total TA) and a scheduling offset (e.g., K_mac) provided in an NTN configuration, after receiving the TA report.

As shown in FIG. 5B, for TA maintenance in the RRC_CONNECTED state, process 52 may introduce some procedures that are different from the legacy TA, as follows.

Action 509: The UE may maintain GNSS by either tracking GNSS or fixing (to stop tracking) the GNSS-acquired UE location. If UE keeps tracking the GNSS, power consumption and the GNSS measurement gap (agreed to be discussed in 3GPP Technical Specification Group (TSG) Radio Access Network (RAN) Working Group 4 (WG4) (otherwise known as RAN4) may be considered.

In one implementation, the NW may not know whether the UE needs a GNSS measurement gap. Therefore, the UE capability report by an RRC message may carry some information about whether the UE can transmit an NR signal and receive a GNSS signal at the same time without any measurement gap configured by the NW.

In one implementation, the UE may not track a GNSS signal due to power saving concerns. Therefore, whether the UE fixes GNSS location or keeps tracking the GNSS signal in the RRC_CONNECTED state may be reported to the NW by the RRC message.

Action 510: The NW may update the satellite ephemeris information and the common TA via SI update or change. For example, the satellite ephemeris information and the common TA may be broadcast and updated every 80 ms. In one implementation, as specified in Rel-16, the UE may acquire the SI when a common search space to receive the SI is configured, while the acquired SI is periodically broadcast.

In one implementation, the NW may not update the satellite ephemeris information and the common TA every few milliseconds. Therefore, UE may need to predict the current satellite ephemeris information and common TA values based on parameters provided by the NW, e.g., the moving speed of the satellite and the change rate of the common TA.

In one implementation, the SI may not support a need for frequent updates. Therefore, the NW may use dedicated RRC messages, a MAC CE, or DCI formats to convey the satellite ephemeris information and the common TA.

Action 511: The UE may update the UE-gNB RTT (i.e., the sum of the UE's TA value (e.g., total TA) and a scheduling offset (e.g., K_mac) provided in an NTN configuration) by updating ($N_{TA,UE\text{-}specific}+N_{TA,common}$) based on the acquired information of the GNSS-acquired UE location, the satellite ephemeris information, and the common TA. If the SI is updated via SI change notifications in a Short Message or UE dedicated signalling, the NW may know the update timing of $N_{TA,common}$ and may not know when the UE updates $N_{TA,UE\text{-}specific}$.

In one implementation, the NW may not know whether the UE updates $N_{TA,UE\text{-}specific}$. Therefore, the NW may enable or disable the UE to update $N_{TA,UE\text{-}specific}$ in the RRC_CONNECTED state by an RRC message or a MAC CE.

In one implementation, the UE may need a GNSS measurement gap. Therefore, if the GNSS measurement gap is configured, the NW may expect the UE only to update $N_{TA,UE\text{-}specific}$ within the GNSS measurement gap. If the GNSS measurement gap is not needed, the NW may configure the UE to update $N_{TA,UE\text{-}specific}$ in a periodic, semi-persistent, or aperiodic manner, configured by an RRC message and a MAC-CE, and triggered by DCI formats.

In one implementation, the UE may not know when to trigger an $N_{TA,UE\text{-}specific}$ update. Therefore, there may be some scenarios/cases to trigger the UE to update $N_{TA,UE\text{-}specific}$ as in the following:
1) receiving an NTN-specific scheduling offset K_offset used to extend scheduling offset K1 and K2 values for UL transmission;
2) receiving a satellite ephemeris information update from the NW;
3) receiving a common TA update from the NW;
4) receiving a UL grant from the NW;
5) receiving an indication from the NW; and
6) receiving a measurement gap from the NW.

Action 512: The UE may apply the updated UE-gNB RTT (i.e., the sum of the UE's TA value (e.g., total TA) and a scheduling offset (e.g., K_mac) provided in an NTN configuration) as a TA value for a UL transmission.

In one implementation, the NW and the UE may not have the same understanding of the scheduling timing. Therefore, when any unsynchronized scheduling timing between the UE and the NW happens such that the UE cannot apply the TA value for the scheduled UL transmission, UE may drop the scheduled UL transmission.

In one implementation, the NW may not know that the UE cannot apply the latest TA calculated by the UE. Therefore, the UE may initiate a TA report and send the latest TA value to the NW after this error has been identified by the UE.

Action 513: The NW may measure a timing error based on reception timing of the UL transmission.

In one implementation, the NW may not correct the error if the error is greater than the maximum TA adjustment given by the 6-bit TAC. Therefore, the NW may handle this error by at least one of the following:
1) triggering the UE to update $N_{TA,UE\text{-}specific}$;
2) sending new $N_{TA,common}$; and
3) using the 12-bit TAC and providing positive and negative values by adding an offset.

Action 514: The NW may send a PDSCH carrying the 6-bit TAC in a MAC-CE based on the measurement.

In one implementation, the NW may not treat the common TA as the open-loop TA control. Therefore, to integrate the common TA into the closed-loop TA control, the common TA, a common TA drift rate, and the 6-bit TAC may be carried in a same PDSCH or a new MAC CE and may be activated at the same time.

Action 515: The UE may parse a received MAC-CE and adjust a TA value by $N_{TA}+(N_{TA,UE\text{-}specific}+N_{TA,common}+N_{TA,offset})$, where $N_{TA}$ is carried from the 6-bit TAC in the MAC-CE.

In one implementation, the UE may not be able to apply the TA to send the corresponding HARQ-ACK due to unsynchronized scheduling between the UE and the NW. If the UE cannot apply the adjusted TA on the HARQ-ACK, UE may handle this by one of the following:

1) dropping the HARQ-ACK; and
2) applying another TA value to send the HARQ-ACK that is applicable and is closest to the adjusted TA.

Action 516: The UE may update the UE-gNB RTT (i.e., the sum of the UE's TA value (e.g., total TA) and a scheduling offset (e.g., K_mac) provided in an NTN configuration) if needed, e.g., $N_{TA,UE\text{-}specific}$ has been updated.

Action 517: The UE may apply the updated UE-gNB RTT (i.e., the sum of the UE's TA value (e.g., total TA) and a scheduling offset (e.g., K_mac) provided in an NTN configuration) as a TA value and report $N_{TA,UE\text{-}specific}$ or a UE location via a PUSCH.

In one implementation, the UE may not use a MAC-CE to report a TA value. Therefore, if TA reporting is based on UCI, the TA value may be reported via a PUCCH or multiplexing on a PUSCH when the PUCCH and the PUSCH have a time overlap.

In one implementation, the NW may not need a high-quality TA value. Therefore, the reported TA values may have the following granularity:

1) in ms;
2) in a slot number considering SCS;
3) the same as TA value in the 6-bit TAC;
4) in a sub-frame number; and
5) in a system frame number.

Action 518: The NW may know the absolute TA after receiving the TA report.

Figures 6A, 6B:
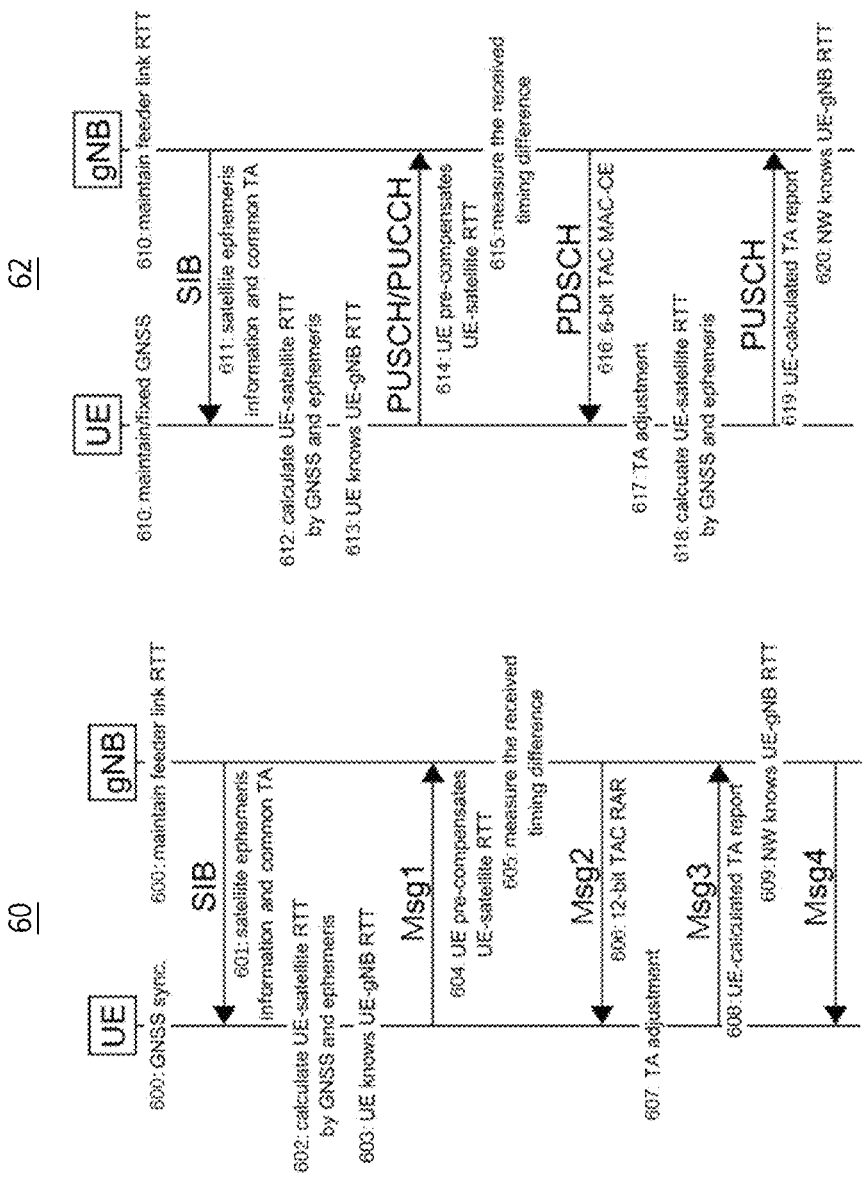
FIG. 6A is a flowchart illustrating a process for an initial TA in an RRC_IDLE state or an RRC_INACTIVE state for a reference point (RP) in a satellite, according to an example implementation of the present disclosure.
FIG. 6B is a flowchart illustrating a process for a maintenance TA in an RRC_CONNECTED state for another RP in a satellite, according to an example implementation of the present disclosure.

FIG. 6A is a flowchart illustrating a process 60 for an initial TA in an RRC_IDLE state or an RRC_INACTIVE state for a reference point (RP) in a satellite, according to an example implementation of the present disclosure. FIG. 6B is a flowchart illustrating a process 62 for a maintenance TA in an RRC_CONNECTED state for another RP in a satellite, according to an example implementation of the present disclosure. In comparison with FIG. 5A and FIG. 5B, it may propose differences of FIG. 6A and FIG. 6B in the common TA, $N_{TA,common}$ (including TA uncertainty and feeder link delay) being maintained by the NW via an offset on UL frames.

Action 600: The UE may ensure GNSS is ready. GNSS information may be either fixed or tracked by the UE. The NW may ensure that UL and DL frames are misaligned by delaying the UL frame timing with a feeder link RTT (i.e., a scheduling offset, a variable/parameter as K_mac, and/or the satellite-gNB RTT).

In one implementation, the NW may fail to maintain the feeder link RTT (i.e., a scheduling offset, a variable/parameter as K_mac, and/or the satellite-gNB RTT) due to a channel condition. Therefore, the UE may receive an indication from SI that informs the UE that the NW is currently out of synchronization due to a large timing error to maintain the feeder link RTT (i.e., a scheduling offset, a variable/parameter as K_mac, and/or the satellite-gNB RTT).

In one implementation, if the UE determines the feeder link is out of synchronization, the UE may suspend or drop any scheduled UL transmission for a given or configured period. The resumption of UL transmission may be triggered by another indication from the NW or after another timer expires.

Action 601: The NW may broadcast satellite ephemeris information, the feeder link RTT (i.e., a scheduling offset, a variable/parameter as K_mac, and/or the satellite-gNB RTT), and a TA offset $N_{TA,offset}$ via the SI.

In one implementation, the UE may not know whether a TA margin is needed. Therefore, the NW may indicate whether the TA margin for PRACH transmission is "Enabled" or "Disabled".

In one implementation, if the TA margin is set to "Enabled", UE may delay the TA margin value, e.g., half of CP or provided by the NW, for PRACH preamble transmission; otherwise (if the TA margin is set to "Disabled"), the NW may advance one TA margin value for UL slot frame reception timing.

In one implementation, the UE may not need high-quality information about the feeder link RTT (i.e., a scheduling offset, a variable/parameter as K_mac, and/or the satellite-gNB RTT). Therefore, the NW may provide the feeder link RTT (i.e., a scheduling offset, a variable/parameter as K_mac, and/or the satellite-gNB RTT) in the form of one of the following:

1) milliseconds;
2) a symbol number;
3) a slot number;
4) a subframe number;
5) a PDCCH monitoring period; and
6) other formats, e.g., (a) a rough location of an gNB; and (b) a rough location of a reference point on the ground or in the air.

In one implementation, the UE may not know whether the received feeder link RTT (i.e., a scheduling offset, a variable/parameter as K_mac, and/or the satellite-gNB RTT) is the latest version used by the NW. Therefore, the NW may perform the following:

1) only updating the feeder link RTT (i.e., a scheduling offset, a variable/parameter as K_mac, and/or the satellite-gNB RTT) for its UL slots on specific timing, e.g., SFN=4;
2) updating the feeder link RTT (i.e., a scheduling offset, a variable/parameter as K_mac, and/or the satellite-gNB RTT) on its UL slots after the feeder link RTT (i.e., a scheduling offset, a variable/parameter as K_mac, and/or the satellite-gNB RTT) has been broadcast;
3) providing a timestamp about when the feeder link RTT (i.e., a scheduling offset, a variable/parameter as K_mac, and/or the satellite-gNB RTT) is used by the NW, e.g., an absolute time or a DL slot where the UE receives the feeder link RTT (i.e., a scheduling offset, a variable/parameter as K_mac, and/or the satellite-gNB RTT) in the SI; and
4) providing the drift rate of the feeder link RTT (i.e., a scheduling offset, a variable/parameter as K_mac, and/or the satellite-gNB RTT).

In one implementation, the UE may not be configured with the feeder link RTT (i.e., a scheduling offset, a variable/parameter as K_mac, and/or the satellite-gNB RTT) in the SI due to NW implementation issues. If the feeder link RTT (i.e., a scheduling offset, a variable/parameter as K_mac, and/or the satellite-gNB RTT) is absent, the UE may assume the feeder link RTT (i.e., a scheduling offset, a variable/parameter as K_mac, and/or the satellite-gNB RTT) to be one of the following:

1) zero;
2) a minimum feeder link RTT value in the serving cell based on the altitude of the serving satellite;
3) a maximum feeder link RTT value based on the received K_offset and the UE-calculated TA.

In one implementation, the UE may receive a K_offset in the SI. A K_offset value refers to the UE-gNB RTT (i.e., the sum of the UE's TA value (e.g., total TA) and a scheduling offset (e.g., K_mac) provided in an NTN configuration) estimated by the NW to schedule Msg3 transmission before the NW knows the UE-calculated TA. If K_offset is greater than the feeder link RTT (i.e., a scheduling offset, a variable/parameter as K_mac, and/or the satellite-gNB RTT), the UE may treat this as an error case and stop sending a PRACH.

In one implementation, the NW may need to configure a maximum value for the UE-calculated TA. If the maximum value of the UE-calculated TA is provided, the UE may derive the feeder link RTT (i.e., a scheduling offset, a variable/parameter as K_mac, and/or the satellite-gNB RTT) by the K_offset and the maximum UE-calculated TA. If the UE-calculated TA is greater than the maximum UE-calculated TA provided by the NW, the UE may use the maximum UE-calculated TA for PRACH preamble transmission.

In one implementation, the NW may need to configure a minimum value for the UE-calculated TA to avoid multi-user interference. If the UE-calculated TA is smaller than the minimum UE-calculated TA provided by the NW, the UE may use the minimum UE-calculated TA for PRACH preamble transmission.

Action 602: The UE may calculate the UE-satellite RTT by satellite ephemeris information and GNSS-acquired UE location as $N_{TA,UE\text{-}specific}$.

In one implementation, the UE may not know whether the satellite ephemeris information is the latest information. Therefore, the NW may provide a timestamp or a reference subframe for the UE to estimate the latest UE-satellite RTT.

Action 603: The UE may know the UE-gNB RTT (i.e., the sum of the UE's TA value (e.g., total TA) and a scheduling offset (e.g., K_mac) provided in an NTN configuration) from the UE-satellite RTT and the feeder link RTT (i.e., a scheduling offset, a variable/parameter as K_mac, and/or the satellite-gNB RTT) obtained from the SI.

In one implementation, the UE may have an estimation error on the UE-calculated TA. If the estimated value of the UE-gNB RTT (i.e., the sum of the UE's TA value (e.g., total TA) and a scheduling offset (e.g., K_mac) provided in an NTN configuration) is greater than the K_offset, the UE may use the K_offset as a UE-gNB RTT assumption.

In one implementation, the UE and the NW may not have a common understanding of the UE-gNB RTT (i.e., the sum of the UE's TA value (e.g., total TA) and a scheduling offset (e.g., K_mac) provided in an NTN configuration). Therefore, the NW may configure the UE-gNB RTT (i.e., the sum of the UE's TA value (e.g., total TA) and a scheduling offset (e.g., K_mac) provided in an NTN configuration) by an RRC message or a MAC CE, e.g., a reuse K_offset or a new MAC CE format, for MAC layer timers and PHY layer scheduling based on UE's TA or location report. The UE may report the UE-gNB RTT (i.e., the sum of the UE's TA value (e.g., total TA) and a scheduling offset (e.g., K_mac) provided in an NTN configuration) by sending the difference between the latest update and the previous report via the RRC message or the MAC-CE.

Action 604: The UE may apply $N_{TA,UE\text{-}specific}+N_{TA,offset}$ of the TA for sending a Msg1.

In one implementation, the UE may consider a TA margin for sending the Msg1, i.e., PRACH preamble transmission.

If the NW provides a TA margin value, an indication of the TA margin, or a common TA, the UE may apply $N_{TA,UE\text{-}specific}+N_{TA,offset}+N_{common}$, where $N_{common}$ refers to the TA margin, e.g., half of CP.

In one implementation, the UE may not apply the TA value on the selected PRACH occasion to send Msg1 if the calculated TA is a large value. Therefore, the NW may provide a minimum UE-gNB RTT (i.e., the sum of the UE's TA value (e.g., total TA) and a scheduling offset (e.g., K_mac) provided in an NTN configuration) of a cell as a scheduling offset between an SSB and a PRACH occasion for the UE to select a valid and available PRACH occasion.

Action 605: The NW may measure the timing error from the Msg1 reception. The Msg1 may be located within the CP limit and the NW may receive the Msg1 if the UL frame at the NW has been delayed by the feeder link RTT (i.e., a scheduling offset, a variable/parameter as K_mac, and/or the satellite-gNB RTT) perfectly. Specifically, the timing error may include estimation errors for both a feeder link RTT (i.e., a scheduling offset, a variable/parameter as K_mac, and/or the satellite-gNB RTT) and a service link RTT.

Action 606: The NW may send a Msg2 carrying the 12-bit TAC in a RAR based on the Msg1 reception.

Action 607: The UE may adjust a RAR window based on the UE-gNB RTT (i.e., the sum of the UE's TA value (e.g., total TA) and a scheduling offset (e.g., K_mac) provided in an NTN configuration) to receive the Msg2. After the Msg2 is received, the UE may adjust the TA by $N_{TA}+(N_{TA,UE\text{-}specific}+N_{TA,offset})$, where $N_{TA}$ is carried from the 12-bit TAC in the RAR.

Action 608: The UE may apply an adjusted TA with the value as $N_{TA}+(N_{TA,UE\text{-}specific}+N_{TA,offset})$ for Msg3 transmission. If the Msg3 has sufficient payload size, the UE may report the UE-calculated TA $N_{TA,UE\text{-}specific}$ or UE location in the Msg3; otherwise, the UE may report $N_{TA,UE\text{-}specific}$ in a Msg5 or other UL grants after the Msg3.

Action 609: The NW may know an absolute TA (i.e., the UE-gNB RTT as the sum of the UE's TA value (e.g., total TA) and a scheduling offset (e.g., K_mac) provided in an NTN configuration) after receiving the TA report.

As shown in FIG. 6B for TA maintenance in the RRC_CONNECTED state, process 62 may introduce some procedures that are different from the legacy TA, as follows:

Action 610: The UE may maintain GNSS by fixing or tracking, and the NW may maintain the feeder link delay.

In one implementation, the NW may fail to maintain the feeder link delay. Accordingly, UE may have a configured timer to check whether the NW still synchronizes with a satellite, and the NW may indicate to the UE whether the feeder link RTT (i.e., a scheduling offset, a variable/parameter as K_mac, and/or the satellite-gNB RTT) is out of synchronization.

In one implementation, if UE determines the feeder link is out of synchronization, the UE may suspend or drop any scheduled UL transmission for a given or configured period. The resumption of UL transmission may be triggered by another indication from the NW or after another timer expires.

In one implementation, the NW may maintain the feeder link RTT (i.e., a scheduling offset, a variable/parameter as K_mac, and/or the satellite-gNB RTT) based on gNB location and the satellite ephemeris information. Meanwhile, UE may maintain the service link RTT (i.e., a scheduling offset, a variable/parameter as K_mac, and/or the satellite-gNB RTT) based on UE location and the satellite ephemeris information. Therefore, the NW and the UE may have the same updating timing, e.g., SFN=0, and the same periodicity, e.g., 80 ms, based on how the satellite ephemeris information is broadcast by the NW. For signaling reduction, the UE may report UE location and the NW may broadcast GW location in the RRC_CONNECTED state.

Action 611: The NW may update the satellite ephemeris information and the satellite-gNB RTT via the SI update, e.g., every 80 ms.

In one implementation, the UE may need the satellite ephemeris information from time to time. Therefore, the UE may request the satellite ephemeris information by an RRC message, and the NW may provide the satellite ephemeris information via the SI or dedicated RRC messages.

In one implementation, the NW may broadcast the satellite ephemeris information via a SIB1 or an NTN SIB. If the satellite ephemeris information is broadcast via the SIB1, the UE may try to acquire the satellite ephemeris information after the UE has received an indication about a change of the SI. If the satellite ephemeris information is broadcast via the NTN SIB, the UE may try to acquire the satellite ephemeris information by an SI-window with a window length and a periodicity configured by the NW.

In one implementation, the NW may have limited DL resources to update the satellite ephemeris information and the feeder link RTT (i.e., a scheduling offset, a variable/parameter as K_mac, and/or the satellite-gNB RTT). Therefore, to reduce signaling overhead, the NW may provide the following:

1) a difference between the latest and the previous values;
2) a drift rate value, e.g., the variation with time, in milliseconds, slots, or subframes, where the starting point to apply the drift rate value may be associated with a DL slot, a subframe, or an SI window; and
3) a GW location or the UE may pre-store the satellite ephemeris information and GW location in UMTS Subscriber Identity Module (U-SIM) and update via the NAS.

In one implementation, the NW may update the UE via the NTN SIBs. The NTN SIBs may be excluded when determining changes in the SI, i.e., changes of the satellite ephemeris information or the feeder link RTT (i.e., a scheduling offset, a variable/parameter as K_mac, and/or the satellite-gNB RTT) may either result in the SI change notifications or as a modification of value Tag in the SIB1.

Action 612: The UE may update the UE-satellite RTT by the GNSS and the satellite ephemeris information.

In one implementation, the UE may not know when to apply or update the received UE-satellite RTT. Accordingly, a corresponding time to apply or update the received UE-satellite RTT may be at least one of the following:

1) after sending corresponding HARQ-ACK information bits;
2) after sending a corresponding RRC Reconfiguration/Setup/Reestablishment/Resume Complete message;
3) after an additional scheduling offset provided by the NW to guarantee a UE PDSCH processing time; and
4) after or during a configured GNSS measurement gap provided by the NW.

Action 613: The UE may update the UE-gNB RTT (i.e., the sum of the UE's TA value (e.g., total TA) and a scheduling offset (e.g., K_mac) provided in an NTN configuration) by reading the satellite gNB RTT from the SI and using the calculated UE-satellite RTT.

In one implementation, the UE may need to reach a common understanding about the UE-gNB RTT (i.e., the sum of the UE's TA value (e.g., total TA) and a scheduling offset (e.g., K_mac) provided in an NTN configuration) between the UE and the gNB. Therefore, the UE may trigger a TA report by sending the UE-gNB RTT (i.e., the sum of the UE's TA value (e.g., total TA) and a scheduling offset (e.g., K_mac) provided in an NTN configuration) to the NW after the UE-gNB RTT (i.e., the sum of the UE's TA value (e.g., total TA) and a scheduling offset (e.g., K_mac) provided in an NTN configuration) is updated by the UE. The NW may configure the UE-gNB RTT (i.e., the sum of the UE's TA value (e.g., total TA) and a scheduling offset (e.g., K_mac) provided in an NTN configuration) by an RRC message or a MAC CE after the UE reports a TA value triggered by the NW.

In one implementation, the validity of the UE-gNB RTT (i.e., the sum of the UE's TA value (e.g., total TA) and a scheduling offset (e.g., K_mac) provided in an NTN configuration) may be controlled by a configured timer. The timer may start and restart after a TA report is sent to the NW. The timer may expire after a configured period. The UE-gNB RTT (i.e., the sum of the UE's TA value (e.g., total TA) and a scheduling offset (e.g., K_mac) provided in an NTN configuration) may be valid if the timer is still running.

In one implementation, the UE-gNB RTT (i.e., the sum of the UE's TA value (e.g., total TA) and a scheduling offset (e.g., K_mac) provided in an NTN configuration) may be used at least for a drx-HARQ-RTT-TimerDL, i.e., if HARQ processes with a DL HARQ feedback enabled, the drx-HARQ-RTT-TimerDL length is increased by an offset, i.e., existing values within a value range increased by the offset, based on the UE-gNB RTT (i.e., the sum of the UE's TA value (e.g., total TA) and a scheduling offset (e.g., K_mac) provided in an NTN configuration).

Action 614: The UE may apply the updated TA to compensate the UE-satellite RTT for a UL transmission.

In one implementation, the NW may not know an accurate UE-gNB RTT (i.e., the sum of the UE's TA value (e.g., total TA) and a scheduling offset (e.g., K_mac) provided in an NTN configuration). Therefore, an error due to non-synchronized scheduling may happen such that the UE may not apply the updated TA for a scheduled UL transmission, i.e., the scheduling offset K1, K2, and K_offset is insufficient to cover the updated TA. Therefore, if this happens, the UE may drop the scheduled UL transmission and send a TA report instead.

Action 615: The NW may measure a timing error based on reception timing of the UL transmission.

Action 616: The NW may send a PDSCH carrying the 6-bit TAC in a MAC-CE based on the measurement.

In one implementation, the NW may not correct the measured UL timing by the 6-bit TAC. Therefore, the NW may send an additional TA adjustment by an RRC message as common TA, or the NW may trigger a PDCCH-order RACH.

Action 617: The UE may adjust a value of the TA (e.g., total TA) with $N_{TA}+(N_{TA,UE\text{-}specific}+N_{TA,offset})$, where $N_{TA}$ is carried from the 6-bit TAC.

In one implementation, the UE may not apply the received TAC due to a limitation of a maximum or a minimum total TA value configured by the NW, e.g., the minimum/maximum RTT in a cell as 8 ms/25.77 ms for the LEO at a 600 km orbit. Therefore, if this happens, the UE may ignore the TAC and initiate a TA report based on the minimum or maximum total TA value.

Action 618: The UE may update the UE-satellite RTT $N_{TA,UE\text{-}specific}$.

In one implementation, the UE may not update the UE-satellite RTT before applying the received TAC for a UL transmission, which leads to a larger TA change for the UL transmission due to contributions from both the open-loop TA control and the closed-loop TA control. Therefore, if the maximum TA change is configured by the NW, then whether to combine both TA adjustments from the open-loop TA control and the closed-loop TA control may be based on the configured maximum TA change value. Otherwise (if there is no maximum TA change), the UE may not adjust the UE-satellite RTT (i.e., the open-loop TA control) for a UL transmission when the closed-loop TA control provides adjustment on the UL transmission.

Action 619: The UE may apply the updated TA and report $N_{TA,UE-specific}$ or UE location via a PUSCH.

In one implementation, the NW may not trigger or configure a TA report to the UE. Therefore, if the UE has a CG or a dynamic grant CG resource, the UE may send a TA report autonomously.

Action 620: The NW may know the absolute TA as the UE-gNB RTT (i.e., the sum of the UE's TA value (e.g., total TA) and a scheduling offset (e.g., K_mac) provided in an NTN configuration) after receiving the TA report.

Figure 7:
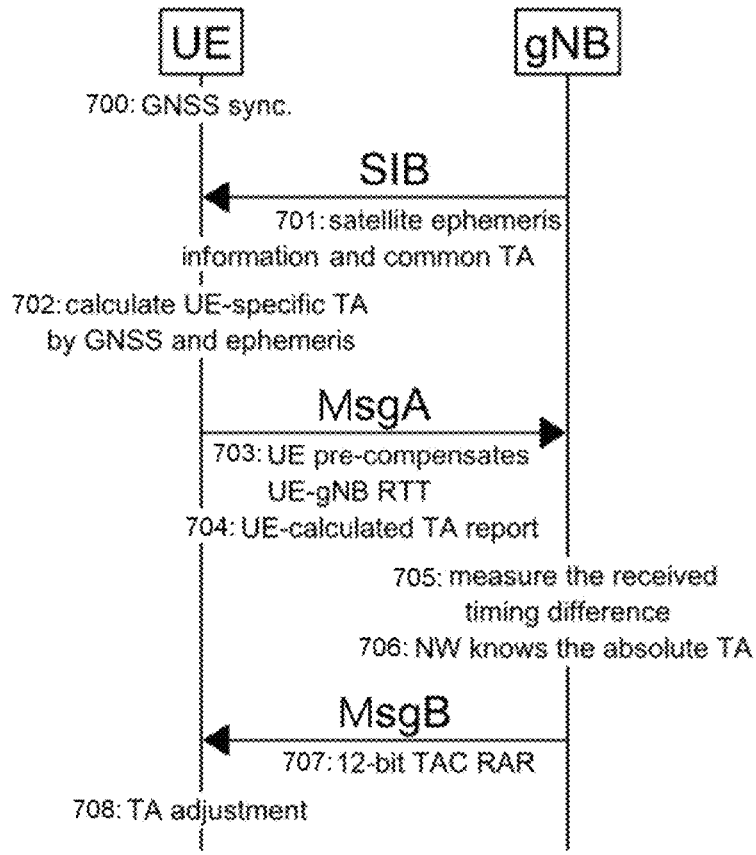
FIG. 7 is a flowchart illustrating a process for an initial TA of a gNB under a 2-step RACH, according to an example implementation of the present disclosure.

FIG. 7 is a flowchart illustrating a process 70 for an initial TA of a gNB under a 2-step RACH, according to an example implementation of the present disclosure. For the 2-step RACH, other than the 4-step RACH, when an RP is set to a gNB, some background may be prepared to replace a Msg1 and a Msg3 with a MsgA as well as to replace a Msg2 and a Msg4 with a MsgB.

As shown in FIG. 7 for the initial TA, process 70 may introduce some procedures that are different from the legacy TA, as follows.

Action 700: The UE may ensure GNSS is ready. A GNSS-acquired UE location may be used for cell selection and reselection combining with serving cell and nearby satellite ephemeris information.

In one implementation, the UE may not trigger GNSS synchronization all the time due to power-saving concerns. Therefore, the UE may trigger, measure, or track the GNSS synchronization when at least one of the following occur:

1) the RA procedure having been triggered;
2) a configured GNSS measurement window being started that is provided by the NW, e.g., a SIB1, as a GNSS measurement gap configuration; and
3) the ULE camping on an NTN cell.

Action 701: The NW may broadcast the satellite ephemeris information and the common TA $N_{TA,common}$ (for TA uncertainty and feeder link delay), and a TA offset $N_{TA,offset}$ by sending a SIB1 or an NTN SIB if a size of the SIB1 is not enough for the satellite ephemeris information.

In one implementation, the UE may not know if the common TA includes TA uncertainty. Therefore, the SIB1 may carry an indication as to whether the TA uncertainty has been included. If the TA uncertainty is included in the common TA, the UE may not delay by a TA margin, e.g., half of CP, to transmit a PRACH preamble that has applied a TA value; otherwise (if the TA uncertainty is not included in the common TA), the UE may delay the TA margin to transmit the preamble.

Action 702: The UE may calculate the UE-satellite RTT by the satellite ephemeris information and GNSS-acquired UE location as $N_{TA,UE-specific}$.

In one implementation, the satellite ephemeris information may be outdated due to a long RTT. Therefore, the satellite ephemeris information may include timing information, e.g., the satellite ephemeris information is used for a particular time, for the UE to predict the current satellite location used for calculating the UE-satellite RTT.

In one implementation, the GNSS-acquired UE location may be outdated due to UE movement, e.g., on a flight.

Therefore, the UE may predict the current UE location based on UE movement, e.g., fast (mounted device), normal (handheld), or fixed (VAST).

Action 703: The UE may apply $N_{TA,UE-specific}+N_{TA,common}+N_{TA,offset}$ of the TA for sending the MsgA.

In one implementation, the selected RACH occasion for the Msg1 may not be able to apply the calculated TA. Therefore, in that case, the UE may select the next RACH occasion. The NW may provide assistance information that provides a minimum time gap between an SSB and a proper RACH occasion.

In one implementation, the UE may not know whether to use $N_{TA,UE-specific}$ or $N_{TA,common}$ for sending the Msg1. The UE may determine whether to use $N_{TA,UE-specific}$ based on one of the following: 1) an NTN cell indication in a SIB1; and 2) a PLMN ID. The UE may determine whether to use $N_{TA,common}$ based on one of the following: 1) whether $N_{TA,common}$ being provided in the SIB1 (if $N_{TA,common}$ is not configured, then the default value is zero); and 2) an indication of whether the UL and DL timing alignment may be set to the gNB (if the indication is not configured, the default is set to the gNB).

Action 704: If the MsgA has sufficient payload size, the UE may report the TA value or coarse UE location in the MsgA; otherwise, the UE may report the TA value in other UL grants after the MsgA.

In one implementation, the NW may not know how the UE compensates $N_{TA}$. Therefore, to reach the same understanding of the scheduling timing between the NW and the UE, the UE may report an adjusted TA or a total TA that is applied for the UL transmission carrying the TA report.

In one implementation, the UE may need additional processing time if the TA report includes a current TA value. Therefore, to reduce complexity, the UE may report $N_{TA,UE-specific}$ used for sending the MsgA, regardless of whether the TA report is carried via the MsgA or other UL grants.

In one implementation, the TA report may not contain an accurate UE location. Therefore, the UE may indicate whether the UE location report is allowed via an RRC message to the NW. The UE may report a physical cell ID decoded from an SSB or a timestamp associated with a UL slot, a TAI/TAC, or a SFN as a replacement for the accurate UE location.

Action 705: The NW may measure the timing difference between the MsgA reception and the configured RO. The MsgA may be located within the CP and the NW may not receive the Msg1 before the configured RO to prevent issues regarding using an TA adjustment via the 12-bit TAC.

In one implementation, the timing error of the MsgA may be greater than the CP limit. If the NW has multiple FFT windows to receive a timing range for the MsgA, the MsgA may be decoded successfully. In this case, an indication of whether the NW can decode an Msg1 with a timing error greater than the CP limit may be provided in the SIB 1.

In one implementation, the timing error of the MsgA may lead to the MsgA reception time before the configured RO. When this happens, if the NW can still decode the MsgA, the 12-bit TAC may include at least one of the following: 1) a negative value, which may be supported by using a reserved value in the 12-bit TAC, e.g., the current TA values are {0, 1, 2, ..., 3846} indicated by using 12 bits, and when the TA value 3847 is used, it may imply a negative TA value; and 2) triggering the UE to apply the TA margin value, e.g., half of CP via an indication or a reserved TA value, e.g., 3847.

Action 706: The NW may send a MsgB carrying the 12-bit TAC in a RAR based on the MsgA reception.

In one implementation, the UE may not apply the TA margin to prevent using a negative TA value. Therefore, the NW may have a timing delay, e.g., half of CP, between a UL slot and a DL slot to ensure the MsgA reception can be received after a configured RO. The NW may broadcast if the timing delay for the TA margin is used.

Action 707: The NW may know the absolute TA (i.e., the UE-gNB RTT as the sum of the UE's TA value (e.g., total TA) and a scheduling offset (e.g., K_mac) provided in an NTN configuration) after receiving the TA report.

Action 708: The UE may adjust a RAR window based on the UE-gNB RTT (i.e., the sum of the UE's TA value (e.g., total TA) and a scheduling offset (e.g., K_mac) provided in an NTN configuration) to receive the MsgB. After receiving MsgB, the UE may adjust a value of the TA by $N_{TA}+(N_{TA,UE-specific}+N_{TA,common}+N_{TA,offset})$, where $N_{TA}$ is carried from the 12-bit TAC in a RAR.

In one implementation, $N_{TA,UE-specific}$ may be outdated due to UE/satellite movement. Therefore, the UE may update $N_{TA,UE-specific}$ and if its value is not the same as the one used for sending the MsgA, the UE may determine whether to update $N_{TA,UE-specific}$ if an indication is provided by the NW or by default.

In one implementation, $N_{TA}$ may be outdated regarding a propagation delay for sending the 12-bit TAC. Therefore, the UE may predict the current $N_{TA}$ if an indication is provided by the NW or by default.

Figure 8:
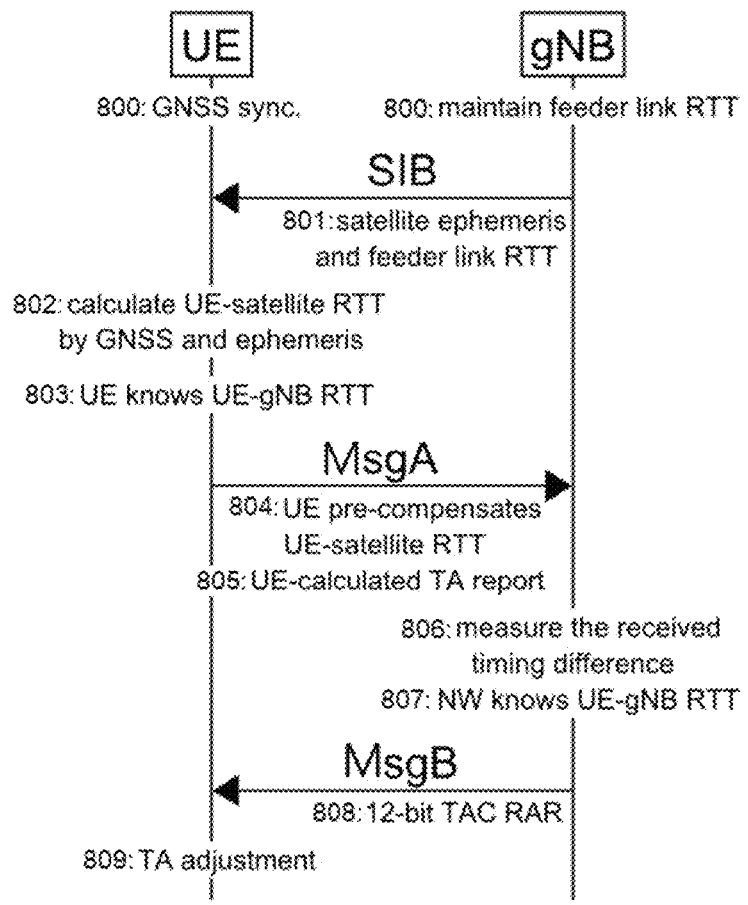
FIG. 8 is a flowchart illustrating a process for an initial TA of a satellite under a 2-step RACH, according to an example implementation of the present disclosure.

FIG. 8 is a flowchart illustrating a process 80 for an initial TA of a satellite under a 2-step RACH, according to an example implementation of the present disclosure. For 2-step RACH when an RP is set to a satellite, as in the example of FIG. 8, the common TA, $N_{TA,common}$ (including TA uncertainty and feeder link delay), may be maintained by the NW.

As shown in FIG. 8, for the initial TA, process 80 may introduce some procedures that are different from the legacy TA, as follows.

Action 800: The UE may ensure GNSS being ready. GNSS information may be either fixed or tracked by the UE. The NW may ensure UL and DL frames are misaligned by delaying the UL frame timing with the feeder link RTT (i.e., a scheduling offset, a variable/parameter as K_mac, and/or the satellite-gNB RTT).

Action 801: The NW may broadcast the satellite ephemeris information, the feeder link RTT (i.e., a scheduling offset, a variable/parameter as K_mac, and/or the satellite-gNB RTT), and a TA offset $N_{TA,offset}$ via a SI.

Action 802: The UE may calculate the UE-satellite RTT by the satellite ephemeris information and GNSS-acquired UE location as $N_{TA,UE-specific}$.

Action 803: The UE may know the UE-gNB RTT (i.e., the sum of the UE's TA value (e.g., total TA) and a scheduling offset (e.g., K_mac) provided in an NTN configuration) from the UE-satellite RTT and the feeder link RTT (i.e., a scheduling offset, a variable/parameter as K_mac, and/or the satellite-gNB RTT) obtained from the SI.

Action 804: The UE may apply $N_{TA,UE-specific}+N_{TA,offset}$ of the TA for sending a MsgA.

In one implementation, the UE may consider a TA margin for sending the MsgA, i.e., PRACH preamble transmission. If the NW may provide a TA margin value, an indication of the TA margin, or a common TA, the UE may apply $N_{TA,UE-specific}+N_{TA,offset}+N_{common}$, where $N_{common}$ refers to a TA margin, e.g., half of CP.

In one implementation, the UE may not apply the TA value on the selected PRACH occasion to send the MsgA if the calculated TA is a larger value. Therefore, the NW may provide the minimum UE-gNB RTT (i.e., the sum of the UE's TA value (e.g., total TA) and a scheduling offset (e.g., K_mac) provided in an NTN configuration) of a cell as a scheduling offset between an SSB and a PRACH occasion for the UE to select a valid and available PRACH occasion.

Action 805: If the MsgA has a sufficient payload size, the UE may report the UE-calculated TA $N_{TA,UE-specific}$ or UE location in the MsgA; otherwise, the UE may report $N_{TA,UE-specific}$ in other UL grants after the MsgA.

Action 806: The NW may measure a timing error from the MsgA reception. The MsgA may be located within the CP limit and the NW may receive the MsgA if the UL frame at the NW has been delayed by the feeder link RTT (i.e., a scheduling offset, a variable/parameter as K_mac, and/or the satellite-gNB RTT) perfectly, where the timing error may include estimation errors for both the feeder link RTT (i.e., a scheduling offset, a variable/parameter as K_mac, and/or the satellite-gNB RTT) and the service link RTT.

Action 807: The NW may know an absolute TA, i.e., the UE-gNB RTT (i.e., the sum of the UE's TA value (e.g., total TA) and a scheduling offset (e.g., K_mac) provided in an NTN configuration), after receiving the TA report.

Action 808: The NW may send a MsgB carrying the 12-bit TAC in a RAR based on the MsgA reception.

Action 809: The UE may adjust a RAR window based on the UE-gNB RTT (i.e., the sum of the UE's TA value (e.g., total TA) and a scheduling offset (e.g., K_mac) provided in an NTN configuration) to receive the MsgB. After the MsgB is received, the UE may adjust a value of the TA by $N_{TA}+(N_{TA,UE-specific}+N_{TA,offset})$, where $N_{TA}$ is carried from the 12-bit TAC in a RAR.

In some implementations, if a received DL timing changes and is not compensated or is only partly compensated by an UL timing adjustment without any TAC, the UE may change $N_{TA}$ accordingly. The UE may determine whether the received DL timing changes based on the GNSS, the satellite ephemeris information, and a configured threshold.

If a UE changes an active UL BWP between a time of a common TA reception or a UE-calculated TA update and a time of applying a corresponding adjustment for the UL transmission timing, the UE may determine the TA adjustment value based on the SCS of the new active UL BWP. If the UE changes an active UL BWP after applying an adjustment for the UL transmission timing, the UE may assume the same absolute TA adjustment value before and after the active UL BWP change.

If the UE changes an active UL BWP or the SCS has been changed/switched, UE may need to trigger the UE-specific TA report. If the UE changes an active DL BWP or the SCS has been changed/switched, UE may need to trigger the UE-specific TA report. More specifically, the active DL/UL BWP may be changed/switched by an indication (e.g., a DCI/RRC) from the NW and/or by a timer (e.g., the bwp-InactivityTimer).

UE-gNB RTT Uncertainty

If reporting UE-calculated TA in a Msg3 or a Msg5 is supported, the UE and the NW may have a common understanding of the absolute timing advance value $T_{TA}$ in the RRC_CONNECTED state. Once the UE starts to adjust its timing by changing $N_{TA,UE-specific}$, the NW may not know this change is caused by a UE adjustment or caused by an RTT change due to UE/satellite movement. Thus, the NW may lose the total TA value used by the UE, and the schedule may have issues.

A simple solution is to support the TA reporting in the RRC_CONNECTED state. If UE continues to adjust its UL timing between TA reports, there may be a huge uncertainty for the NW to know the total TA value and the UE-gNB RTT (i.e., the sum of the UE's TA value (e.g., total TA) and a scheduling offset (e.g., K_mac) provided in an NTN configuration).

In Rel-16, a UE autonomous TA adjustment is supported for UL timing correction, which may only happen when the UE cannot meet the UL timing requirement and the transmission timing error beyond a threshold.

In some implementations, a combination of the closed-loop TA control and the open-loop TA control may have the maximum amount of timing change within a period configured by the NW. The total TA value may have a maximum value configured by the NW.

In some implementations, between two consecutive TA commands provided by the NW or two TA reports sent by the UE, the UE may adjust its UL timing based on the GNSS, the satellite ephemeris information, and the common TA.

In one implementation, when the transmission timing difference between the UE and the reference timing exceeds a variable as ±Te, the UE may be required to adjust its timing to within the variable Te. The reference timing may be a UE-calculated TA ($N_{TA,UE-specific}$)×$T_c$ based on the latest satellite ephemeris information and GNSS UE location. The variable Te may refer to the error tolerance determined by a configured SCS or configured by the NW in milliseconds.

In one implementation, all adjustments for the UE UL timing may follow at least one of the following rules:
1) The maximum amount of the magnitude of the timing change in one adjustment may be a variable Tp;
2) The minimum aggregation adjustment rate may be the variable Tp per second; and
3) The maximum aggregation adjustment rate may be a variable Tq per 200 ms, where the variables Tp and Tq are determined by a configured SCS or configured by the NW in milliseconds.

In one implementation, the TA reporting may be initiated when the transmission timing error exceeds the tolerance error as the variable ±Te.

Support for the satellite ephemeris information being broadcast may be based at least on one of the following format options:

Option 1: Satellite ephemeris information format based on satellite position and velocity state vectors.
  FFS: Details on state vectors formats
  FFS: Details on time reference provisioning/format
Option 2: Satellite ephemeris information format based on orbital elements.
  FFS: Details on orbital elements formats
  FFS: Details on time reference provisioning/format
  FFS: Whether down-selection is needed or both options are supported In some implementations, some details on time reference provisioning/formatting may be as follows:

There may be no need to include the epoch time which can be implicitly known as a reference time linked to the DL subframe where the NTN SIB is broadcast.

Specifically, the epoch time may refer to a timestamp associated with the satellite ephemeris information, which provides information for the UE to predict and interpolate the satellite position when more ephemeris (i.e., satellite ephemeris information) data is received.

Signaling Other than SIB

If the UE-gNB RTT (i.e., the sum of the UE's TA value (e.g., total TA) and a scheduling offset (e.g., K_mac) provided in an NTN configuration) is unknown, the UE may not transform the satellite ephemeris information at the epoch time (i.e., the time the gNB sends) into the satellite ephemeris information at the current time (i.e., the time the UE receives).

It is unclear whether the NTN SIB may be supported if there is no NTN SIB, such that how to define the epoch time is unclear.

The NTN SIB and the DL subframe may refer to a period, and the epoch time may be a point of time, where it is unclear how to define the point for the epoch.

The satellite ephemeris information may not only be used for initial access but also used for mobility and UL timing synchronization. For the latter cases, the NW may use dedicated RRC messages in a UE-specific manner rather than a SIB, such that it is unclear how to determine the epoch time implicitly or explicitly.

In some implementations, the epoch time may be specific to a boundary of a system frame. The system frame can be the one that receives satellite ephemeris information or a system frame that the NW indicates by an RRC message.

In one implementation, the NW may provide the epoch time explicitly in minutes, seconds, and milliseconds. If the explicit epoch time or the UE-gNB RTT (i.e., the sum of the UE's TA value (e.g., total TA) and a scheduling offset (e.g., K_mac) provided in an NTN configuration) is provided, the UE may compensate the RTT by transforming the satellite ephemeris information at the epoch time (i.e., the time an gNB sends the satellite ephemeris information) into the satellite ephemeris information at the current time (i.e., the time the UE receives the satellite ephemeris information).

In one implementation, if the epoch time is linked to the DL subframe, the association may be more specific.

For example, if the satellite ephemeris information is received, the epoch time may correspond to the SFN boundary at or immediately after the ending boundary of the SI-window in which the NTN SIB is transmitted, where the SFN boundary, the ending boundary, the SI-window, and the NTN SIB may be replaced by the following terms.

In one implementation, the SFN boundary may be replaced by a frame boundary, a sub-frame boundary, a slot boundary, an OFDM symbol boundary, an SI modification period boundary, or a DL/UL reception/transmission boundary.

In one implementation, the ending boundary may be replaced by a beginning or a closest or an ending boundary of the last allowed scheduled DL OFDM symbol, a starting boundary of the RS detection window aligning with a starting boundary of the first allowed scheduled UL OFDM symbol, or an ending boundary of the SFN of a primary cell.

In one implementation, the SI-window may be replaced by the system frame indicated by the NW, where the system frame is not the frame where satellite ephemeris information is transmitted but the frame either in the past or in the future of the frame where satellite ephemeris information is transmitted, the system frame, the subframe, the last slot, the first slot, the end of a PDCCH that schedules the DL, or the start of the CP.

In one implementation, the NTN SIB may be replaced by satellite ephemeris information, a SIB1, other SIBs, or UE-specific signaling via an RRC/MAC-CE/DCI.

Figure 9:
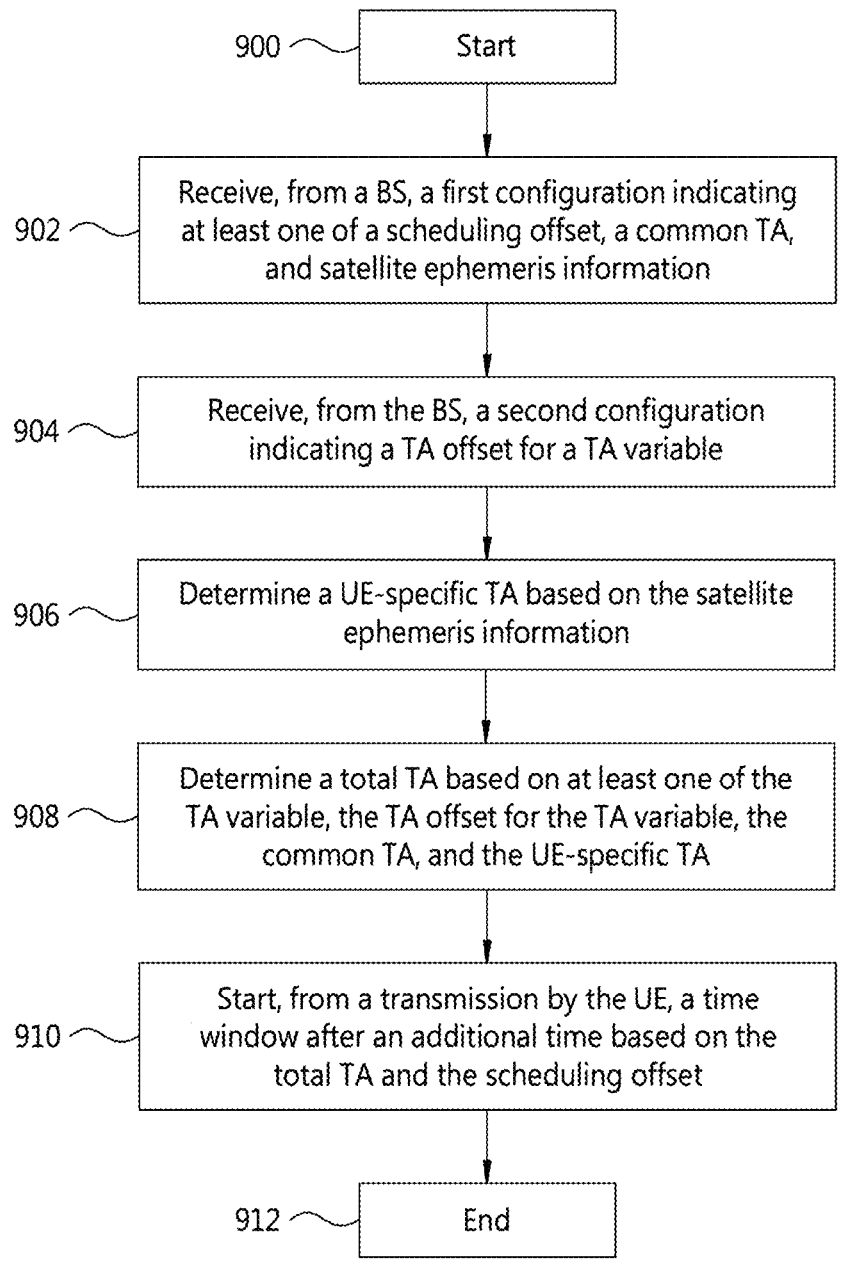
FIG. 9 illustrates a flowchart of a procedure performed by a UE for timing alignment, according to an example implementation of the present disclosure.

FIG. 9 illustrates a flowchart of a procedure 90 performed by a UE for timing alignment, according to an example implementation of the present disclosure. In some implementations, actions the procedure 90 are illustrated as separate actions represented as independent blocks. In some other implementations, these separate actions may not be construed as necessarily order dependent, where any two or more actions may also be performed and/or combined with each other or be integrated with other alternate methods, which is not limiting the scope of the implementation. Moreover, in some other implementations, one or more of the actions may be adaptively omitted.

As shown in FIG. 9, the process 90 for the UE includes the following actions:

Action 900: Start.

Action 902: Receive, from a BS, a first configuration indicating at least one of a scheduling offset, a common Timing Advance (TA), and satellite ephemeris information.

Action 904: Receive, from the BS, a second configuration indicating a TA offset for a TA variable.

Action 906: Determine a UE-specific TA based on the satellite ephemeris information.

Action 908: Determine a total TA based on at least one of the TA variable, the TA offset for the TA variable, the common TA, and the UE-specific TA.

Action 910: Start, from a transmission by the UE, a time window after an additional time based on the total TA and the scheduling offset.

Action 912: End.

In some implementations, in action 902, the UE may receive the first configuration indicating at least one of the scheduling offset, the common TA, and the satellite ephemeris information from the BS. Specifically, the first configuration is an NTN configuration, and the first configuration is received via SI. Specifically, a unit of the scheduling offset may include a number of slots. In action 904, the UE may receive the second configuration indicating the TA offset for the TA variable from the BS. Specifically, the TA variable is a TA between a DL transmission of the UE and a UL transmission of the UE. In actions 906 and 908, the UE may determine the UE-specific TA based on the satellite ephemeris information, so as to determine the total TA based on at least one of the TA variable, the TA offset for the TA variable, the common TA, and the UE-specific TA. Accordingly, in action 910, the UE may start, from one transmission performed by the UE, one time window after one additional time based on the total TA and the scheduling offset. In one implementation, the window is an RA response window or a MsgB response window. In one implementation, the transmission performed by the UE is transmitted on a PRACH.

In some implementations, the process 90 may further configure the UE to determine the scheduling offset to be zero if the scheduling offset is not provided by the BS. In some implementations, the process 90 may further configure the UE to set a length of a timer by increasing a value based on the UE-specific TA and the scheduling offset. Specifically, the timer may be a DRX HARQ RTT timer.

Figure 10:
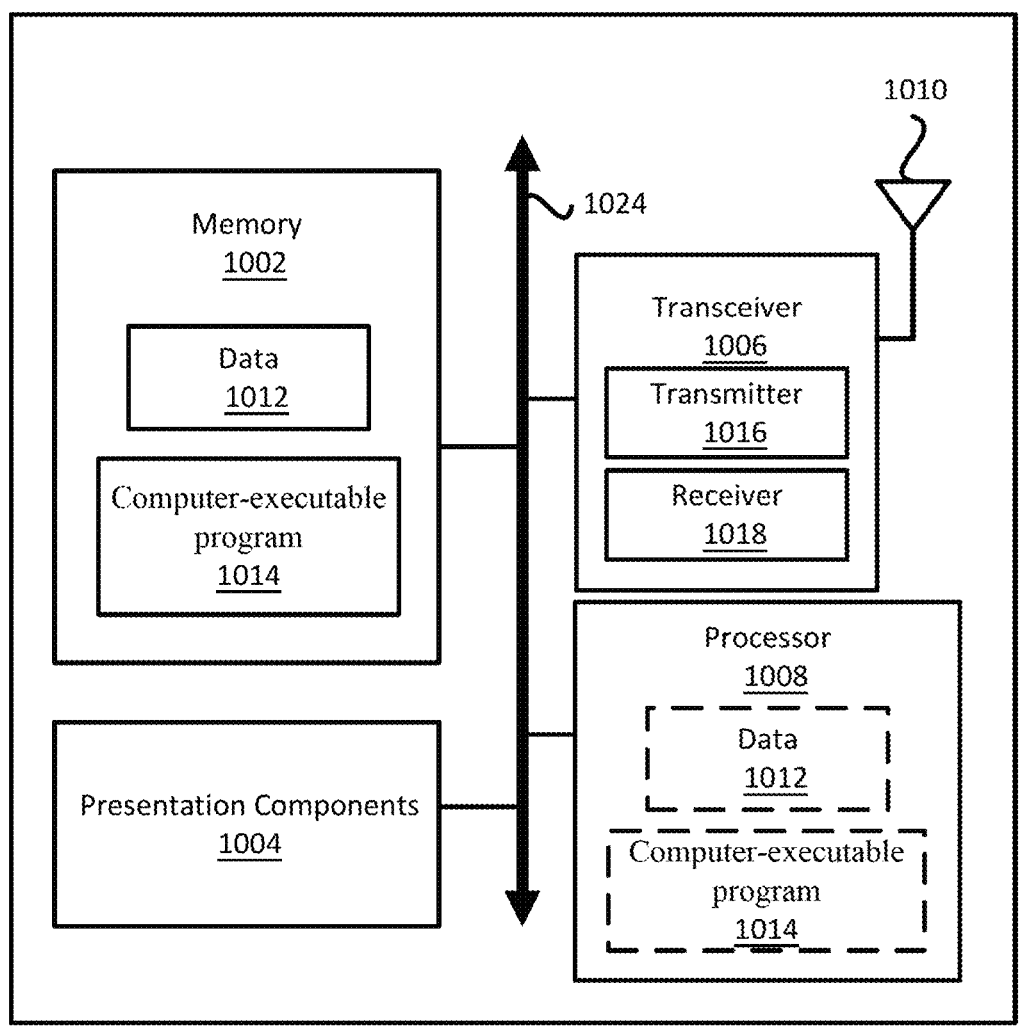
FIG. 10 is a block diagram illustrating a node for wireless communication according to an implementation of the present disclosure.

Please refer to FIG. 10, which illustrates a block diagram of a node 1000 for wireless communication according to an implementation of the present disclosure. As illustrated in FIG. 10, the node 1000 includes a transceiver 1006, a processor 1008, a memory 1002, one or more presentation components 1004, and at least one antenna 1010. The node 1000 may also include a Radio Frequency (RF) spectrum band module, a BS communications module, an NW communications module, and a system communications management module, input/output (I/O) ports, I/O components, and power supply (not explicitly illustrated in FIG. 10). Each of these components may be in communication with each other, directly or indirectly, over one or more buses 1024. The node 1000 may be a UE, an NW, a cell/BS or any operating entity in the wireless communication system that performs various functions disclosed herein, for example, with reference to FIG. 9.

The transceiver 1006 includes a transmitter 1016 (e.g., transmitting/transmission circuitry) and a receiver 1018 (e.g., receiving/reception circuitry) and may be configured to transmit and/or receive time and/or frequency resource partitioning information. The transceiver 1006 may be configured to transmit in different types of subframes and slots, including, but not limited to, usable, non-usable and flexibly usable subframes and slot formats. The transceiver 1006 may be configured to receive data and control channels.

The node 1000 may include a variety of computer-readable media. Computer-readable media may be any available media that may be accessed by the node 1000 and include both volatile (and non-volatile) media and removable (and non-removable) media. By way of example, and not limitation, computer-readable media may include computer storage media and communication media. Computer storage media may include both volatile (and non-volatile) and removable (and non-removable) media implemented according to any method or technology for storage of information such as computer-readable.

Computer storage media includes RAM, ROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media does not include a propagated data signal. Communication media may typically embody computer-readable instructions, data structures, program modules, or other data in a modulated data signal such as a carrier wave or other transport mechanism and include any information delivery media.

The term "modulated data signal" may refer to a signal that has one or more of its characteristics set or changed in such a manner as to encode information in the signal. By way of example, and not limitation, communication media may include wired media such as a wired NW or direct-wired connection, and wireless media such as acoustic, RF, infrared, and other wireless media. Combinations of any of the previous disclosure should also be included within the scope of computer-readable media.

The memory 1002 may include computer-storage media in the form of volatile and/or non-volatile memory. The memory 1002 may be removable, non-removable, or a combination thereof. For example, the memory 1002 may include solid-state memory, hard drives, optical-disc drives, etc.

As illustrated in FIG. 10, the memory 1002 may store a computer-executable (or readable) program 1014 (e.g., software codes or instructions) that are configured to, when executed, cause the processor 1008 to perform various functions disclosed herein, for example, with reference to FIG. 10. Alternatively, the computer-executable program 1014 may not be directly executable by the processor 1008 but may be configured to cause the node 1000 (e.g., when compiled and executed) to perform various functions disclosed herein.

The processor 1008 (e.g., having processing circuitry) may include an intelligent hardware device, a CPU, a microcontroller, an ASIC, etc. The processor 1008 may include memory. The processor 1008 may process the data 1012 and the computer-executable program 1014 received from the memory 1002, and information received via the transceiver 1006, the baseband communications module, and/or the NW communications module. The processor 1008 may also process information to be sent to the transceiver 1006 for transmission through the antenna 1010 to the NW communications module for subsequent transmission to a CN.

One or more presentation components 1004 may present data to a person or other device. Examples of presentation components 1004 may include a display device, speaker, printing component, vibrating component, etc.

From the present disclosure, it is manifested that various techniques may be used for implementing the disclosed concepts without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the particular disclosed implementations. Many rearrangements, modifications, and substitutions are possible without departing from the scope of the present disclosure.

What is claimed is:

1. A method performed by a User Equipment (UE) for timing alignment, the method comprising:
   receiving, from a Base Station (BS), a first configuration indicating at least one of a scheduling offset, a common Timing Advance (TA), and satellite ephemeris information;
   receiving, from the BS, a second configuration indicating a TA offset for a TA variable;
   determining a UE-specific TA based on the satellite ephemeris information;
   determining a total TA based on at least one of the TA variable, the TA offset for the TA variable, the common TA, and the UE-specific TA;
   determining the scheduling offset to be zero if the scheduling offset is not provided by the BS, wherein the scheduling offset includes a feeder link Round Trip Time (RTT); and
   starting, from a transmission by the UE, a time window after an additional time based on the total TA and the scheduling offset.

2. The method of claim 1, wherein the time window is a Random Access (RA) response window or a Message B (MsgB) response window.

3. The method of claim 1, wherein the transmission by the UE occurs on a Physical Random Access Channel (PRACH).

4. The method of claim 1, wherein the TA variable is a TA between a Downlink (DL) transmission of the UE and an Uplink (UL) transmission of the UE.

5. The method of claim 1, wherein the first configuration is a Non-Terrestrial Network (NTN) configuration.

6. The method of claim 1, wherein the first configuration is received via System Information (SI).

7. The method of claim 1, wherein a unit of the scheduling offset comprises a number of slots.

8. The method of claim 1, further comprising:
   setting a length of a timer by increasing a value based on the UE-specific TA and the scheduling offset.

9. The method of claim 8, wherein the timer is a Discontinuous Reception (DRX) Hybrid Automatic Repeat Request (HARD) RTT timer.

10. A User Equipment (UE) in a wireless communication system for timing alignment, the UE comprising:
    at least one processor; and
    at least one memory coupled to the at least one processor, the at least one memory storing computer-executable instructions that, when executed by the at least one processor, cause the UE to:
    receive, from a Base Station (BS), a first configuration indicating at least one of a scheduling offset, a common Timing Advance (TA), and satellite ephemeris information;
    receive, from the BS, a second configuration indicating a TA offset for a TA variable;
    determine a UE-specific TA based on the satellite ephemeris information;
    determine a total TA based on at least one of the TA variable, the TA offset for the TA variable, the common TA, and the UE-specific TA;
    determine the scheduling offset to be zero if the scheduling offset is not provided by the BS, wherein the scheduling offset includes a feeder link Round Trip Time (RTT); and
    start, from a transmission by the UE, a time window after an additional time based on the total TA and the scheduling offset.

11. The UE of claim 10, wherein the time window is a Random Access (RA) response window or a Message B (MsgB) response window.

12. The UE of claim 10, wherein the transmission by the UE occurs on a Physical Random Access Channel (PRACH).

13. The UE of claim 10, wherein the TA variable is a TA between a Downlink (DL) transmission of the UE and an Uplink (UL) transmission of the UE.

14. The UE of claim 10, wherein the first configuration is a Non-Terrestrial Network (NTN) configuration.

15. The UE of claim 10, wherein the first configuration is received via System Information (SI).

16. The UE of claim 10, wherein a unit of the scheduling offset comprises a number of slots.

17. The UE of claim 10, wherein the computer-executable instructions, when executed by the at least one processor, further cause the UE to:
    set a length of a timer by increasing a value based on the UE-specific TA and the scheduling offset.

18. The UE of claim 17, wherein the timer is a Discontinuous Reception (DRX) Hybrid Automatic Repeat Request (HARD) RTT timer.

* * * * *